(12) United States Patent
Hashimoto

(10) Patent No.: US 6,682,045 B2
(45) Date of Patent: Jan. 27, 2004

(54) VALVE OPENING/CLOSING DRIVE DEVICE

(75) Inventor: Katsuo Hashimoto, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/285,285

(22) Filed: Oct. 31, 2002

(65) Prior Publication Data

US 2003/0089871 A1 May 15, 2003

(30) Foreign Application Priority Data

Nov. 9, 2001 (JP) ........................ 2001-344804

(51) Int. Cl.[7] ................ F16K 27/10; F16K 27/12
(52) U.S. Cl. .................. 251/129.11; 251/315.1; 251/339
(58) Field of Search ............... 251/129.01–129.22, 251/304–317.01, 339

(56) References Cited

U.S. PATENT DOCUMENTS

| | | | | |
|---|---|---|---|---|
| 4,354,525 A | * | 10/1982 | Oyama et al. | 251/129.01 |
| 4,858,886 A | * | 8/1989 | Tatara | 251/129.07 |
| 5,443,241 A | * | 8/1995 | Odaira et al. | 251/129.07 |
| 5,680,880 A | * | 10/1997 | Miyake et al. | 251/129.11 |
| 6,178,956 B1 | * | 1/2001 | Steinmann et al. | 251/129.07 |
| 6,279,552 B1 | * | 8/2001 | Okada et al. | 123/568.2 |

* cited by examiner

*Primary Examiner*—Paul J. Hirsch
(74) *Attorney, Agent, or Firm*—Hogan & Hartson LLP

(57) ABSTRACT

A valve opening/closing drive device includes a main body case formed by press molding and connected respectively with an inflow pipe and an outflow pipe. A valve element is provided within the main body case for opening and closing an opening part and a motor having a stator part placed on the outside of the main body case and a rotor part positioned inside of the main body case and opposite to the stator part for opening and closing the valve element is also provided. The device further includes a holder member supported by the main body case and provided with a temporary holding part for temporarily holding the inflow pipe or the outflow pipe when the pipes are joined with the main body case.

21 Claims, 18 Drawing Sheets

VALVE OPENING/CLOSING DRIVE DEVICE

BACKGROUND OF THE INVENTION

1. Field of the Invention

The present invention relates to a valve opening/closing drive device wherein a valve element is operated by driving of a motor to open or close a flow passage.

2. Description of Related Art

A valve opening/closing drive device has been conventionally known as a device for opening or closing a flow passage or the like for a refrigerant in a refrigerator or an air conditioner to perform a temperature control in a chamber communicating with the flow passage. The valve opening/closing drive device has a valve element used as an opening or closing valve which advances or retreats in an axial direction by a rotary force of a motor. A general constitution is described as follows.

As shown in FIG. 18, a main body case 502 of a valve opening/closing drive device 501 includes two case members 502a, 502b brought into contact and joined with each other. A plurality of apertures (not shown in the figure) are formed in the case member 502a which is made of brass, and the respective apertures are joined with an inflow pipe 505 for flowing a fluid to the interior of the main body case 502 and with a outflow pipe 506 for flowing the fluid to the outside of the main body case 502. When assembling, the inflow pipe 505 and the outflow pipe 506 are temporarily held to the through-holes of the case member 502a and then completely fixed by brazing or the like.

A stator case 508 storing a stator portion of a motor 507 inside thereof is fixed to the outer peripheral face of the main body case 502. FIG. 18 shows a view before the stator case 508 is fitted to the main body case 502 in the direction shown by an arrow X'.

Accordingly, the stator portion held inside the stator case 508 is fitted to the main body case 502 in a positioned state. As a result, the stator portion is opposed to a rotor, which is disposed rotatably within the main body case 502, interposing the main body case 502. A valve element for advancing or retreating in an axial direction by rotation of the rotor is provided in the main body case 502 and one of the apertures are opened or closed in accordance with advancing or retreating operation of the valve element.

In the conventional valve opening/closing drive device, the inflow pipe 505 and the outflow pipe 506 are completely fixed to the case member 502a by brazing or the like after the inflow pipe 505 and the outflow pipe 506 are temporarily held in the through-hole of the case member 502a. When the case member 502a joined with the inflow pipe 505 and the outflow pipe 506 is made of brass, the case member 502 can be made thick. Accordingly, the inflow pipe 505 and the outflow pipe 506 can be inserted into the through-hole of the thick case member 502a, the temporary holding of the inflow pipe 505 and the outflow pipe 506 can be performed surely before complete fixing.

However, the brass case member 502a causes an increase in manufacturing cost. For this reason, from the standpoint of the manufacturing cost, it is preferable to use a press mould product whose manufacturing cost is inexpensive for the case member joining the inflow pipe 505 and the outflow pipe 506. On the contrary, when the case member 502a is formed by a press mold product, the case member 502a cannot be made so thick due to the nature of mold. Therefore the through-hole formed in the case member 502a is not so deep. Therefore, it is difficult to hold the inflow pipe 505 and the outflow pipe 506 temporarily when they are attached to the main body case 502.

SUMMARY OF THE INVENTION

It is therefore an aspect of the present invention to provide a valve opening/closing drive device that is able to temporarily holds a pipe securely with respect to a main body case even when the main body case is manufactured with an inexpensive press molded member.

In order to achieve the above aspect, according to the present invention, there is provided a valve opening/closing drive device including a main body case which is connected respectively with an inflow pipe for fluid intake and an outflow pipe for fluid output and guides the fluid from the inflow pipe to the outflow pipe through the main body's inside passage. The device also includes a valve element which opens or closes an opening part provided in the main body case connected to the an inflow pipe or the outflow pipe and a driver provided with a motor having a stator part placed on the outside of the main body case and a rotor part for opening or closing the valve element. A holder member is included that is supported by the main body case and provided with a temporary holding part for temporarily holding the inflow pipe or the outflow pipe when the pipes are joined with the main body case.

In this configuration, since the holder member supported by the main body case is provided with the temporary holding part for temporarily holding the inflow pipe or the outflow pipe when the pipe is joined with the main body case, the joint operation can be performed while satisfactorily keeping the position or orientation (joint angle, position or the like) of the inflow pipe or the outflow pipe.

Preferably, the holder member is provided with a fixing part for positioning and fixing the stator part. In this case, since the stator part and the main body case are positioned through the holder member, the positional accuracy can be maintained even if the main body case expands by the fluid pressure. In the case that the valve element is constituted of a ball valve, a disc plate or the like which is easy to encounter a positional deviation in a rotating direction, according to the embodiment, the main body case and the stator part can be uniquely positioned by the holder member in an axial and rotational direction. Therefore, the mechanical home position and the electrical home position of the stator part can be positioned securely and a positional deviation in the rotational direction can be prevented.

Preferably, a ring-shaped boss member is fixed in the aperture part to perform temporary holding of the inflow pipe or the outflow pipe together with the temporary holding part of the holder member when they are joined with the main body case. In this configuration, the aperture part of the main body case can be constituted in a simple hole and thus its machining can be performed easily. Besides, since the boss member fitted in the aperture part can be utilized as the temporary holding part, the inflow pipe or the outflow pipe can be also easily attached to the main body case.

Preferably, the main body case is constituted of a case body having an opening part, and a base plate having a fixing part for respectively fixing the inflow pipe and the outflow pipe and closing the opening part of the case body, and the holder member is provided with passing-through holes separated from the fixing parts by a prescribed dimension for abutting the outer peripheral faces of the inflow pipe and the outflow pipe.

By this construction, even when the inflow pipe or the outflow pipe is bent depending on the specification, the bending stress does not concentrate on the fixing part only and is dispersed to the holder member through the passing-through hole abutting with the outer peripheral face of the inflow pipe and the outflow pipe. Therefore, at the bending processing, a crack will not occur in the fixing part of the base plate. In addition, the above described passing-through hole can be made a guide for brazing when the outflow pipe or the inflow pipe are brazed in the opening part.

Preferably, the fixing part of the base plate is constituted of a step-like part inserted by the end part of the inflow pipe or the outflow pipe. The step-like part cooperates with the temporary holding part to perform the temporary holding when the inflow pipe or the outflow pipe is joined with the main body case.

In this construction, when the inflow pipe or the outflow pipe is attached and fixed to the base plate, the temporary holding before brazing, for example, can be performed easily and securely by the above described step-like part. That is, the fixing part of the base plate is formed as a stepped portion. The end part of the inflow pipe or the outflow pipe abuts against the deepest part of the step-like part, and the portion apart from the end part of the pipe abuts with the temporary holding part. Therefore, the temporary holding can be reliably realized at two positions. Further, the step-like part contributes to ensure the surface area for brazing to make the fixed strength increase and prevent the leak of the fluid inside from the fixing part of the inflow pipe or the outflow pipe.

DETAILED DESCRIPTION OF THE PREFERRED EMBODIMENTS

Preferred embodiments of the present invention will be described below with reference to the accompanying drawings.

Figure 1:
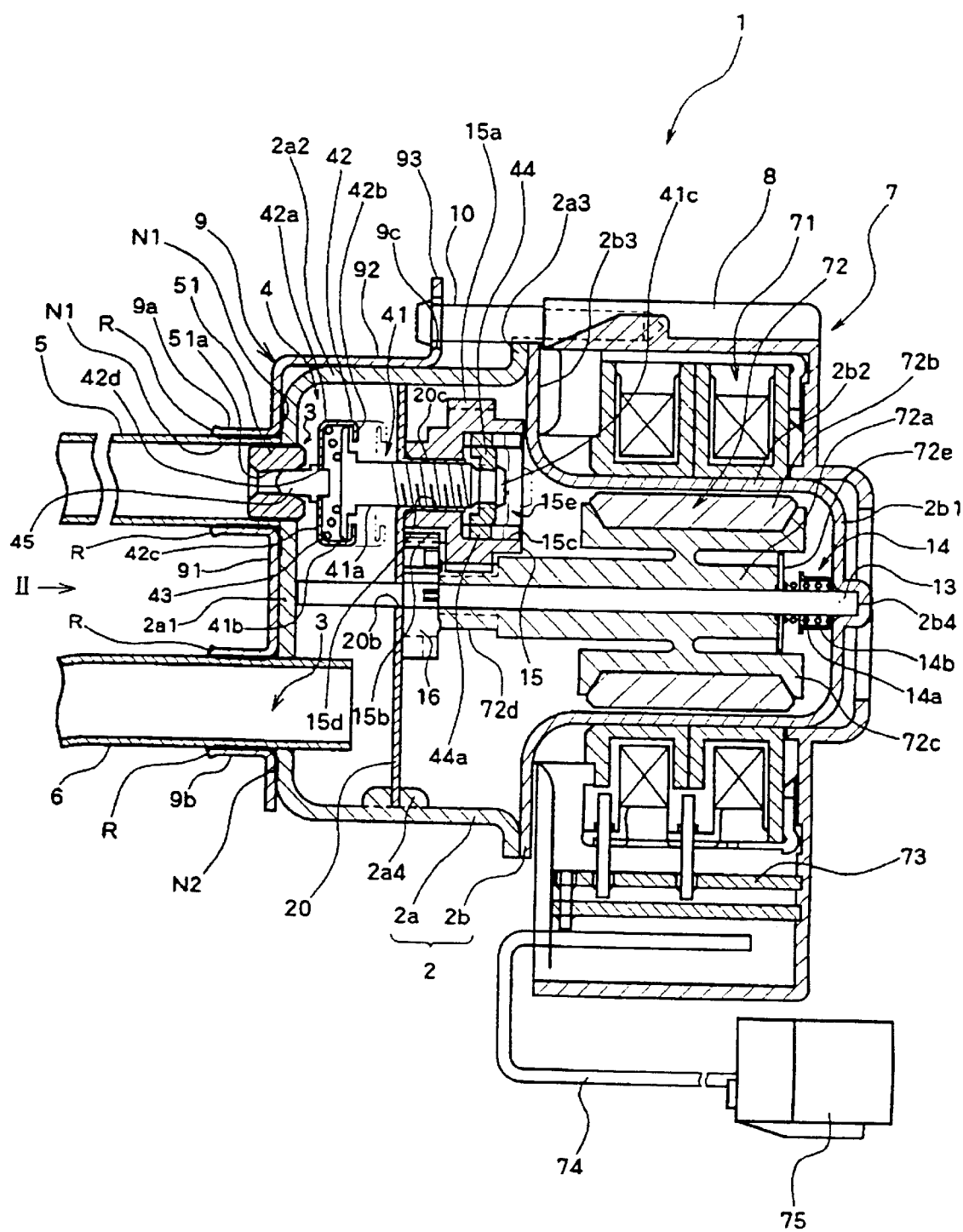
FIG. 1 is a longitudinal cross-sectional view of a valve opening/closing drive device in accordance with a first embodiment of the present invention.
Figure 2:
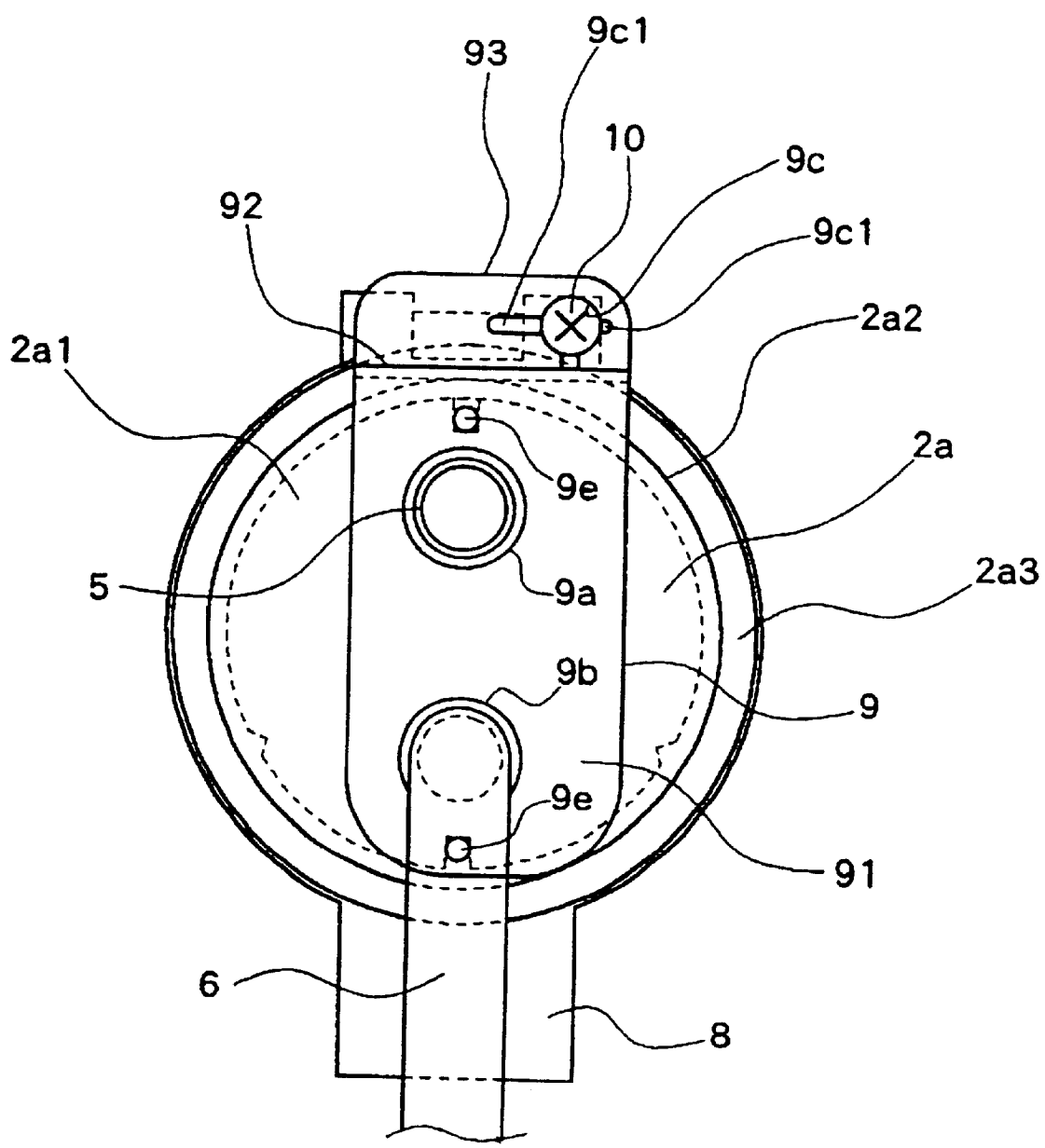
FIG. 2 is a left side view of the valve opening/closing drive device taken in the direction of arrow II in FIG. 1.

A valve opening/closing drive device 1 in accordance with a first embodiment shown in FIGS. 1 and 2 includes a main body case 2 connected with an inflow pipe 5 for flowing fluid inside thereof and an outflow pipe 6 for flowing the fluid out, a valve element 4 for passing/preventing the flow of the fluid by opening or closing the aperture 3 connected to the inflow pipe 5 of the two apertures 3 provided on the main body case 2, a stepping motor 7 (hereafter, merely referred to as a motor) which is a drive means for driving opening or closing the valve element 4, and a holder member 9 provided with a fixing part for fixing the stator 71 of the motor 7.

The main body case 2 guides the fluid flowed into the inside through the inflow pipe 5 to the outflow pipe 6. In this embodiment, two apertures 3 are formed in the main body case 2 and the inflow pipe 5 and the outflow pipe 6 is connected to respective apertures 3, but three or more apertures 3 may be provided. Further, a plurality of inflow pipes 5 or outflow pipes 6 may be provided.

The main body case 2 is constituted by opposedly abutting a first case member 2a and a second case member 2b with each other. Each of the first and second case members 2a and 2b is formed of a roughly cup-shaped product by press drawing work, which is made of stainless steel (SUS) material. The flange parts 2a3 and 2b3 formed at the abutting parts of the first case member 2a and the second case member 2b are brought into tightly contact and fixed by TIG (Tungsten Inert Gas) welding to form a fluid receiving chamber.

The inflow pipe 5 for flowing fluid into the main body case 2 and the outflow pipe 6 for flowing the fluid out the main body case 2 are joined respectively on the bottom wall face 2a1 of the first case member 2a disposed on the left side in FIG. 1.

The first case member 2a has two apertures 3, 3 in the bottom wall face 2a1 and one of which is coupled to the inflow pipe 5 capable of taking the fluid supplied through the inflow pipe 5 into the first case member 2a. Another aperture 3 is used for feeding the fluid taken into the first case member 2a to the outflow pipe 6.

The flange part 2b3 of the second case member 2b is formed wider than the flange part 2a3 of the first case member 2a in an inner direction such that the diameter of a trunk part 2b2 and a bottom wall face 2b1 are smaller than the diameter of the trunk part 2a2 of the first case member 2a. A resin stator case 8 which holds a stator part 71 of the motor 7 is inserted and fixed on the outside of the trunk part 2*b*2 continuing to the inner peripheral end of the flange part 2*b*3. That is, the stator part 71 is abutted against the outside of the trunk part 2*b*2 and the rotor 72 of the motor 7 is oppositely disposed to the stator part 71 inside the trunk part 2*b*2.

A holder member 9 made of SUS material is fixed by a screw 10 to the stator case 8, as shown in FIGS. 1 and 2. The holder member 9 is provided with a tubular part 9*a* inserted to the outside of the inflow pipe 5 and a tubular part 9*b* inserted to the outside of the outflow pipe 6. Consequently, the main body case 2 is structured so as to cover its outside by the stator case 8 and the holder member 9. Each of the tubular parts 9*a*, 9*b* of the holder member 9 is utilized as a temporary holding part when the inflow pipe 5 and the outflow pipe 6 are respectively joined to the main body case 2. In this embodiment, the inflow pipe 5 and the outflow pipe 6 are temporarily held in each of the tubular parts 9*a*, 9*b* which are temporary holding parts and then completely fixed by brazing as described later.

In this embodiment, each of the tubular parts 9*a*, 9*b* which is a temporary holding part for the inflow pipe 5 or the outflow pipe 6 is provided in the holder member 9, but only either one of temporary holding parts for the inflow pipe 5 and the outflow pipe 6 may be provided in the holder member 9.

The holder member 9 is composed of a flat surface part 91 formed in a generally rectangular shape which is used as a abutting face against the bottom wall face 2*a*1 in which the apertures 3 of the main body case 2 are formed, a first extending part 92 bent at an angle of about 90 degrees and extended from the one end of the flat surface part 91 and a second extending part 93 bent at an angle of about 90 degrees and extended further from the one end of the first extending part 92, as shown in FIGS. 1 and 2.

The flat surface part 91 is provided with two holes 9*e* for boss into which two bosses provided on the main body case 2 are fitted respectively. The holes 9*e* for boss are used as support parts for the main body case 2.

A chamfer R is formed at the tip part of the tubular part 9*a* so as to smoothly install the inflow pipe 5 and the boss member 51 inserted to the aperture 3, and a chamfer R is formed at the tip part of the tubular part 9*b* to smoothly install the outflow pipe 6. The first extending part 92 is disposed to tightly contact with the outside of the trunk part 2*a*2 of the first case member 2*a*.

The second extending part 93 is provided with a screw hole 9*c* for passing a screw 10 through to fix the holder member 9 to the stator case 8 and thus is used as a fixing part for fixing the holder member 9 to the stator case 8. The screw hole 9*c* has a slit 9*c*1 so that the stator part 71 held by the stator case 8 can be finely adjusted the position with respect to the main body case 2.

The holder member 9 is positioned with respect to the main body case 2 by fitting the tubular part 9*a* to the inflow pipe 5 connected with the main body case 2 and by fitting the tubular part 9*b* to the outflow pipe 6 connected with the main body case 2. And the holder member 9 positioned by the main body case 2 is fixed to the stator case 8 and thus the stator part 71 held by the stator case 8 is positioned to the main body case 2.

The holder member 9 is also used to restrain deformation (expanding in a left side in FIG. 1) of the first case member 2*a* due to the pressure at the time of the fluid inflow. That is, the first case member 2*a* is subjected to be deformed by the pressure due to the fluid inflow to the main body case 2 but the flat surface part 91 of the holder member 9 is abutted against the main body case 2 and therefore the expanding of the main body case 2 is prevented by the holder member 9.

The inflow pipe 5 is connected to the above described bottom wall face 2*a*1 through the tube-shaped boss member 51 which has a fluid passage hole 51*a* capable of passing the fluid in its center part. That is, the boss member 51 is fitted into the aperture 3 so as to penetrate through the first case member 2*a*1 and one end of the inflow pipe 5 is fitted around the outer peripheral face of the boss member 51 protruding outside of the first case member 2*a*.

Accordingly the inflow pipe 5 is temporarily by being interposed between the outer periphery of the boss member 51 and the inner periphery of the tubular part 9*a*. That is, the boss member 51 is a temporary holding part for holding the inflow pipe 5 together with the tubular part 9*a*. In this temporary holding state, the boss member 51, the first case member 2*a* (main body case 2), the inflow pipe 5 and the tubular part 9*a* of the holder member 9 are integrated by nickel brazing (see reference N1 in FIG. 1) with each other in a state where the stator part 71 is located in a prescribed position with respect to the main body case 2. By this construction, when the inflow pipe 5 is attached to the main body case 2, the attaching work is easily performed.

The outflow pipe 6 is fitted to the first case member 2*a* so as to pass through the tubular part 9*b* of the holder member 9 and the aperture 3 of the first case member 2*a* for extending its end part inside the first case member 2*a*. In this temporary holding state, the first case member 2*a* (main body case 2), the outflow pipe 6 and the tubular part 9*b* of the holder member 9 is integrated with each other by nickel brazing (see reference N2 in FIG. 1) in a state where the stator part 71 is located in a prescribed position with respect to the main body case 2.

As described above, the valve opening/closing drive device in accordance with the first embodiment of the present invention is so constituted that the both tubular parts 9*a*, 9*b* of the holder member 9 are respectively fitted to the pipes 5, 6 to be connected with the main body case 2 to temporarily hold the both pipes 5, 6 with respect to the main body case 2 and then the stator part 71 is positioned and fixed with respect to the main body case 2 by brazing these two places. Therefore, the positional accuracy of the stator part 71 is attained to be satisfactory and the deterioration of precision does not occur for a long period.

When the valve element 4 is constituted by a needle valve as the above mentioned embodiment, the positional shift in a rotational direction does not cause a problem so much. However, when the valve element is constituted by a ball valve, a circular plate or the like, which is liable to cause a positional shift of the valve element in itself in a rotational direction, the positional shift in the rotational direction with the main body case must be severely restricted.

That is, when the valve element such as a ball valve or a circular plate which is easy to move in a rotational direction, a deviation is liable to occur between the electrical home position of the stator and a mechanical home position of the valve element in a rotational direction. Therefore, in this embodiment, the main body case 2 is provided with the holes 9*e* for boss which serve as a support part, and the stator part 71 and the main body case 2 are so constituted as to be securely and mechanically positioned in an axial and rotational direction by means of the holder member 9 having a fixing part fixed to the stator part 71.

As a result, the stator part 71 is mechanically positioned with respect to the main body case 2, and thus the electrical home position of the rotor 72 disposed in the main body case 2 and the home position of the operation member activating the valve element moved by the rotor 72 can be coincided. That is, the main body case and the stator can be uniquely positioned in the axial and rotational direction by means of the holder member and the mechanical home position and the electrical home position of the stator are securely positioned. Consequently, the positional shift in the rotational direction that is easy to cause a problem can be surely prevented.

In this embodiment, the boss member 51 is inserted into the aperture 3 to which the inflow pipe 5 is connected, and the valve element 4 moves forward and backward with respect to the boss member 51. On the contrary, the boss member 51 may be inserted on the outflow pipe 6 side and the valve element 4 moves forward and backward to the boss member 51.

The valve element 4 for opening or closing the aperture 3 to which the inflow pipe 5 is connected and a driving mechanism for driving the valve element 4 are placed inside of the main body case 2. The constitution of the valve element 4 and the driving mechanism is concretely described below.

A plurality of positioning and fixing parts 2a4 are formed on the inner periphery face of the first case member 2a of the main body case 2 (only one part is shown in FIG. 1). A middle base plate 20 is fitted to each of the positioning and fixing parts 2a4 and is fixed by laser welding. Four fitting recessed parts for fitting to the positioning and fixing parts 2a4 are formed at outer periphery end of the middle base plate 20. One of these four fitting recessed parts is formed in a generally square shape which is different from that of other three parts. Other three fitting recessed parts are formed like an elongated rectangular shape. The other three fitting recessed parts are fitted to the respectively corresponding positioning and fixing parts 2a4 of the first case member 2a based on the recessed part in a generally square shape and fixed by laser welding.

The middle base plate 20 is provided with a passing-through hole 20b at a central part and a tube part 20c extended toward the second case member 2b side at a radially outside of the passing-through hole 20b. A shaft 13 rotatably supporting the rotor 72 of a motor 7 is press-fitted to the passing-through hole 20b.

The tube part 20c is formed by burring machining. A screw part is formed on the inner peripheral surface of the tube part 20c to engage threadedly with the screw groove provided on the shaft 41a of the screw member 41 of the valve element 4. The outer peripheral surface of the tube part 20c serves a bearing for supporting a reduction gear 15 which holds the valve element 4 slidably movable and decelerates the rotation of the rotor 72 for transmitting to the valve element 4.

Next, a driving mechanism for opening or closing the valve element 4 is described as follows.

The motor 7 which is a drive means for driving the valve element 4 is constituted of the stator part 71 fitted on the outer peripheral face of the second case member 2b and the rotor 72 rotatably disposed inside of the second case member 2b. The stator part 71 is constituted of two layers of stators placed in an axial direction. Respective end parts of coils wound around the respective stators are tied to respective terminals and the tip parts of the terminals are connected to a circuit board 73 at prescribed positions. The circuit board 73 is connected to an external power source junction 75 through a lead wire 74.

The rotor 72 disposed within the main body case 2 is equipped with a tubular shaft part 72a provided with a hole inserted to the shaft 13, a holding part 72c for holding a ring-shaped magnet 72b and a transmission gear part 72d formed on one end side of the shaft part 72a. The rotor 72 is constituted of a resin molded member that holds the magnet 72b by insert building. The rotor 72 is arranged so that the magnet 72b faces to the inner side of the stator part 71 interposing the trunk part 2b2 of the second case member 2b.

The rotor 72 is so constituted that the shaft part 72a served as the rotary center is inserted and rotatably fitted to the shaft 13. When there is no inflow of a fluid, that is, the fluid passage hole 51a is a closed state, one end of the shaft 13 abuts with the bottom wall face 2a1 of the first case member 2a. The other end of the shaft 13 is supported by fitting into a recessed part 2b4 formed on the bottom wall face 2b1 of the second case member 2b.

When the fluid passage hole 51a is opened, the fluid flows into the main body case 2 and the second case member 2b of the main body case 2 may expand by the pressure of the fluid to bulge on the right side in FIG. 1. When the second case member 2b has expanded, the shaft 13 moves together with the second case member 2b in a thrust direction on the right side in FIG. 1 and its end is away from the bottom wall face 2a1. The shaft 13 is supported such that its one end side is press-fitted to the passing-through hole 20b formed in the middle base plate 20. That is, the shaft 13 is supported at two positions by means of the recessed part 2b4 of the second case member 2b and the passing-through hole 20b. Therefore, even when the bulging of the main body case 2 occurs, the shaft center of the shaft 13 will not shift.

A biasing member 14 is disposed at the recessed part 2b4 to urge the rotor 72 in the axial direction. The biasing member 14 is constituted of a cap washer 14b fixed on the recessed part 2b4, a biasing coiled spring 14a disposed in the cap washer 14b so that the shaft 13 is penetrated through the spring and its one end is fixed to the cap washer 14b, and a washer 72e abutting with another end of the biasing coiled spring 14a and being fixed to the rear end of the rotor 72. Consequently, the rotor 72 inserted to the shaft 13 is biased all times on the first case member 2a side and pushed to a geneva gear 16 held by the middle base plate 20. The rotor 72 is urged on the first case member 2a side while the movement of the rotor in a thrust direction is regulated by the middle base plate 20 over the geneva gear 16. Thus the rotor rotates at a prescribed position where it faces the stator part 71 all times.

In the valve opening/closing drive device 1 of this embodiment, when a fluid such as a refrigerant flows into the main body case 2 from the inflow pipe 5, the main body case 2 may expand by the pressure of the fluid. Concretely, at the time of the inflow of the fluid, the bottom wall face 2b1 of the second case member 2b expands in the right direction in FIG. 1 with the recessed part 2b4 inserted by the shaft 13 as a center and therefore the shaft 13 is also moved. However, the rotor 72 is biased by the biasing coiled spring 14a on the first case member 2a side while it is positioned by the middle base plate 20 via the geneva gear 16, the position of the rotor 72 is maintained at a predetermined location in the thrust direction.

The transmission gear part 72d formed at an end part of the rotor 72 on the first case member 2a side is engaged with the large diameter tooth part 15a of the reduction gear 15. The reduction gear 15 is provided with a through-hole 15d at its rotary center and the through-hole 15d is inserted to the tube part 20c. Consequently, the reduction gear 15 is rotatably supported by an outer peripheral face of the tube part 20c.

The state described with a solid line in FIG. 1 shows that a slide gear 44 and the valve element 4 are moved on the aperture 3 side and the needle valve 45 of the valve element 4 closes the fluid passage hole 51a in the aperture 3. The state described with a two-dot chain line in FIG. 1 shows that the slide gear 44 and the valve element 4 are moved in the direction so as to be separated from the aperture 3 (right direction in FIG. 1) to open the fluid passage hole 51a.

When assembling in this embodiment, the reduction gear 15 is held such that it is fitted to the tube part 20c of the middle base plate 20 to a specified position and the valve element 4 is positioned at a prescribed position, and the valve element 4 is positioned in a state where the valve element 4 closes the fluid passage hole 51a of the boss member 51. And then, the middle base plate 20 is fixed to the inside of the main body case 2. Accordingly, the driving mechanism for driving the valve element 4 including the rotor 72 is positioned with a high precision with respect to the main body case 2.

The valve element 4 is used to open or close the aperture 3. This valve element 4 is provided with a screw member 41 moving forward or backward in an axial direction (left or right direction in FIG. 1) by being driven and rotated by the force of the rotor 72 of the motor 7, and a movable head member 42 mounted movably to the fixed head part 41b of the screw member 41 with a coiled spring 43 as a biasing member interposed between the movable head member 42 and the fixed head part 41b. The needle valve 45 capable of closing the aperture 3 is attached to the movable head member 42 by press fitting.

The screw member 41 is constituted of a shaft part 41a formed with a screw groove on its outer peripheral face, the fixed head part 41b formed at the tip (left end in FIG. 1) of the shaft part 41a having a larger diameter than the shaft part 41a, and a gear holding part 41c formed at the rear end (right end in FIG. 1) of the shaft part 41a. The screw member 41 is formed by so-called header machining. That is, while the fixed head part 41b is rotated in a state held in a holding jig (not shown), the screw groove is formed by cutting on the outer peripheral face of the shaft part 41a. The fixed head part 41b is used as a holding part at the time of header machining.

The rotary center section of the slide gear 44 is press-fitted and fixed to the gear holding part 41c. The slide gear 44 is provided with a passing-through hole of D-shaped cutting to be press-fitted to the gear holding part 41c at the rotary center section. Eighteen triangle-shaped tooth parts 44a, whose tip is not formed like a normal module, are provided on the outermost peripheral part of the slide gear 44. Each of the 18 triangle-shaped tooth parts 44a is engaged with a thrust groove 15c formed in the recessed part 15e of the reduction gear 15 in a slidably movable manner. According to the constitution, when the reduction gear 15 is rotated by the rotor 72, the slide gear 44 is also rotated owing to be driven by the thrust groove 15c. As a result, the screw member 41 is rotated together with the slide gear 44.

When the screw member 41 is rotated, the screw groove of the shaft part 41a is rotated along the screw groove formed on the inner peripheral surface of the tube part 20c. Consequently, the screw member 41 is rotated and moved forward or backward in an axial direction along the thrust groove 15c. As a result, the movable head part 42 held by the fixed head member 41b of the screw member 41 moves forward or backward in the axial direction while rotating with the screw member 41 and the needle valve 45 mounted to the movable head part 42 opens or closes the aperture 3.

The movable head member 42 is formed by press molding. This member 42, as shown in FIG. 1, is constituted of a cylindrical outer peripheral part 42a which covers the outer peripheral part of the fixed head part 41b of the screw member 41, an engaging protrusion 42b which is bent in an inside direction from the end part of the outer peripheral part 42a so as to engage with the rear surface of the fixed head part 41b, and a base part 42c facing on the aperture 3 side.

The movable head member 42 is mounted to the screw member 41 in such a state that the coiled spring 43 is compressed in the axial direction between the base part 42c and the fixed head member 41b of the screw member 41. That is, the movable head member 42 is mounted to the fixed head part 41b in such a manner that it is energized all times to the aperture 3 side by the biasing force of the coiled spring 43 and the engaging protrusion 42b is engaged with the fixed head part 41b. The fixed head part 41b of the screw member 41 is provided in order to perform a header machining as described above, and thus a screw member 41 provided only with a screw groove on a shaft part may be used. According to this embodiment, the movable head member 42 holding the needle valve 45 which has the valve tip for closing the aperture 3 is mounted by using the fixed head part 41b, which is used as a holding part at the time of header machining, the number of component parts can be reduced.

The movable head member 42 is integrally rotated with the screw member 41 when the needle valve 45 is not subjected to a load from the fluid passage hole 51a. When the needle valve 45 closes the fluid passage hole 51a to be subjected to the load by the reaction force due to stopping, the movable head member 42 stops the movement in the rotary and axial directions and is pushed to the fluid passage hole 51a side only by the biasing force of the coiled spring 43. On such an operation, the coiled spring 43 is compressed more in an axial direction than a normal state.

The base part of the needle valve 45 is attached to an attaching hole 42d formed in the base part 42c of the movable head member 42. A flange part is formed on the base part of the needle valve 45 and press-fitted in such a manner that the flange part abuts against the edge of the attaching hole 42d of the base part 42c. Hereby, the needle valve 45 is attached to the movable head member 42. The tip part of the needle valve 45 is formed such that its diameter is equivalent to or a little larger than the inside diameter of the fluid passage hole 51a of the boss member 51. The aperture 3 is closed by the tip part entering into the fluid passage hole 51a and opened by the tip part leaving from the fluid passage hole 51a.

In the valve opening/closing drive device 1 of this embodiment, the reduction gear 15 engaging with the transmission gear part 72d of the rotor 72 is rotated with the rotor 72 when the stator part 71 is energized to rotate the rotor 72. The stator part 71 is precisely positioned with respect to the main body case 2. In addition, the both sides of the rotor 72 in an axial direction is regulated in position and rotated under the state that the rotor is disposed opposite to the stator part 71 positioned by the main body case 2 at a same position all times in the axial direction. Consequently, the rotational torque is stable and the rotor 72 can efficiently transmit a rotating force to the reduction gear 15.

The slide gear 44 is rotated by the reduction gear 15 through the thrust groove 15c which is rotated by the rotor 72. Therefore, the screw member 41 press-fitted with the slide gear 44 is integrally rotated with the slide gear 44. The geneva gear 16 disposed coaxially with the rotor 72 is engaged with the gear tooth of the lock gear 15b and turned every one rotation of the reduction gear 15. When the reduction gear 15 rotates five turns, the reduction gear 15 and the geneva gear 16 are locked.

The screw member 41 rotated with the reduction gear 15 as described above is axially moved during rotation since its screw groove engages threadedly with the screw groove formed on the inner periphery face of the tube part 20c of the middle base plate 20. That is, the screw member 41 moves on the aperture 3 side while being rotated by the rotor 72. Consequently, the movable head member 42 mounted to the fixed head part 41b of the screw member 41 integrally moves in the axial direction while rotated with the screw member 41.

Accordingly, the needle valve 45 mounted in the movable head member 42 enters into the fluid passage hole 51a of the boss member 51 that is fitted into the aperture 3. When the reduction gear 15 has rotated four turns, the tip of the needle valve 45 completely fits into the fluid passage hole 51a. Therefore, the movable head member 42 receives a load from the boss member 51 through the needle valve 45 and does not move in the axial direction and rotate any more. The reduction gear 15 further rotates one turn and the screw member 41 rotates along with the reduction gear 15.

Hereby, the coiled spring 43 disposed between the fixed head member 41b of the screw member 41 and the movable head member 42 is compressed further in the axial direction such that the needle valve 45 attached to the movable head member 42 is pressed on the aperture 3 side with a further stronger force. Accordingly, the needle valve 45 forcibly closes the fluid passage hole 51a in the aperture 3 so that the leak of a fluid from the fluid passage hole 51a can be prevented.

Figure 3:
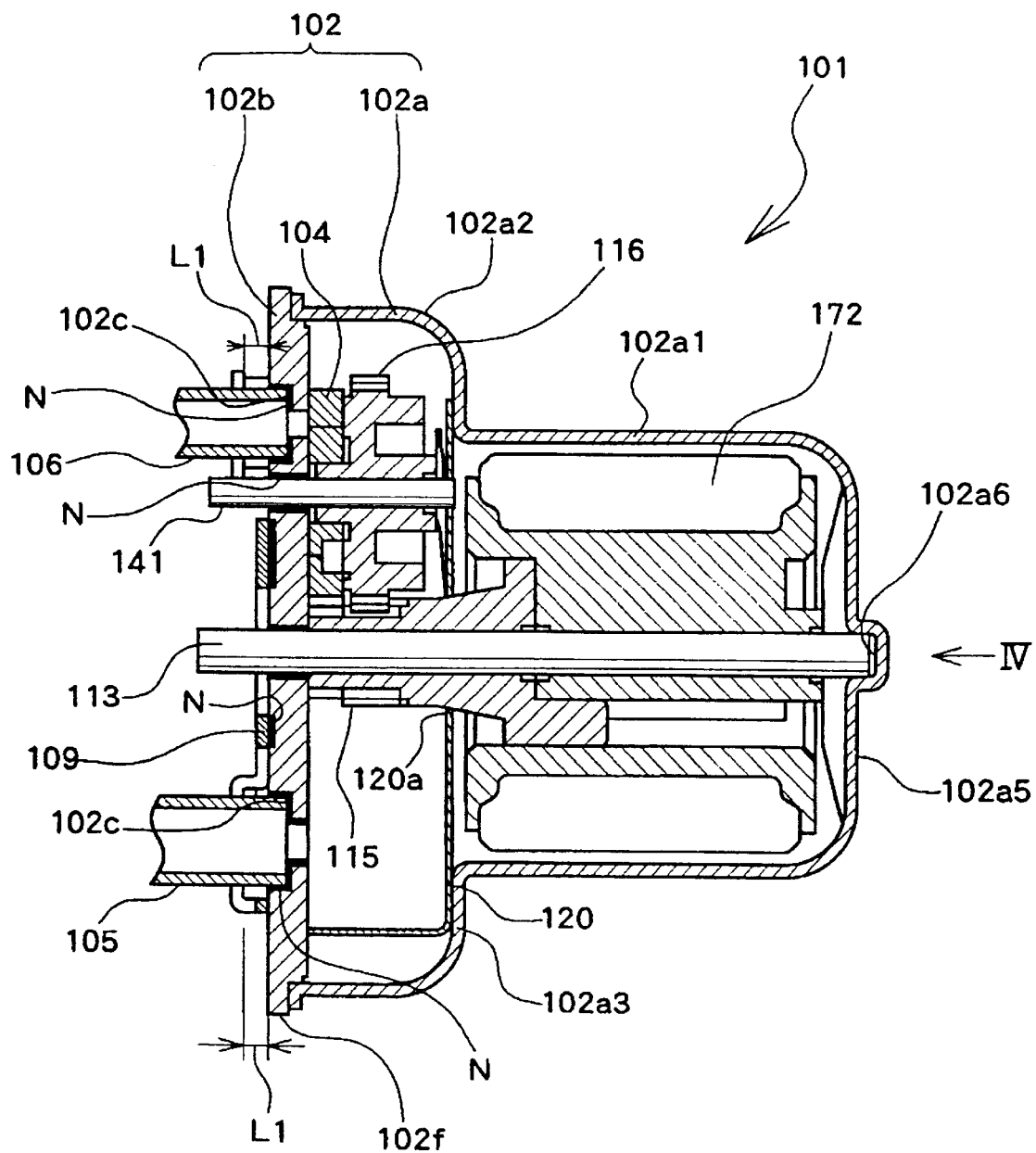
FIG. 3 is a longitudinal cross-sectional view of a valve opening/closing drive device in accordance with a second embodiment of the present invention in which a stator is omitted.

Next, a valve opening/closing drive device according to a second embodiment of the present invention will be described with reference to FIGS. 3 to 8. FIG. 3 is a side view of a state where the stator part of a stepping motor is removed from the valve opening/closing drive device.

The valve opening/closing drive device 101 in accordance with the second embodiment shown in FIG. 3 comprises a main body case 102 constituted of a cup-shaped case body 102a and a base plate 102b closing the opening part of the case body 102a, one inflow pipe 105 and two outflow pipes 106 (only one is shown in FIG. 3) which are respectively fixed to the fixing part 102c of the base plate 102b, a valve element 104 for passing or preventing the flow of a fluid by opening or closing the respective outflow pipes 106, a stepping motor which is a drive means for opening or closing the valve element 104 (partially shown in the drawing), and a holder member 109 provided with a fixing part for fixing the stator (not shown) of the stepping motor (referred to as merely a motor).

A fixed shaft 113 is disposed within the main body case 102 so as to pass through the center position. One end of the fixed shaft 113 is press-fitted into the recessed part 102a6 formed at the bottom face part 102a5 of a case body 102a. The other end side of the fixed shaft 113 is press-fitted and fixed to the base plate 102b with the other end passing through thereof. The rotor 172 of the motor and the output gear part 115 integrally rotating with the rotor 172 are rotatably supported on the fixed shaft 113.

The case body 102a is made of SUS material and constituted of a rotor receiving portion 102a1 which receives the rotor 172 of the stepping motor and a mechanism receiving portion 102a2 which receives the mechanism part activating the valve element 104. The rotor receiving portion 102a1 is so formed that the outside diameter is smaller than that of the mechanism receiving portion 102a2, and a stepped part 102a3 is formed on the rotor receiving portion 102a side of the mechanism receiving portion 102a2. A sheet-shaped middle base plate 120 having a hole 120a in its center section is mounted on the stepped part 102a3. An output gear part 115 fixed on the rotor 172 is disposed so as to pass through the hole 120a.

One end of the fixed shaft 141 is fixed to the middle base plate 120 for rotatably supporting a transmission gear 116 rotated by the output gear part 115. The fixed shaft 141 is press-fitted and fixed so as to penetrate through the base plate 102b and rotatably supports the transmission gear part 116 engaged with the output gear part 115 for rotation.

The rotor 172 is placed inside of the rotor receiving portion 102a1. The stator (not shown) is fixed on the outer peripheral face of the rotor receiving portion 102a so as to oppose to the rotor 172. Therefore, when the stator is energized, magnetic force is generated between the stator and the rotor 172 to rotate the rotor 172. The output gear part 115 rotates together with the rotor 172. The rotation of the output gear part 115 is transmitted to the transmission gear part 116 supported by the fixed shaft 141 to rotate the transmission gear part 116. When the transmission gear part 116 is rotated, the valve element 104 is moved to open or close the aperture which is connected with the outflow pipe 106.

The base plate 102b is formed of a thick flat plate of SUS material and butted against the open end part of the case body 102a. In the state of the butted parts being contacted firmly, the base plate 102b is integrated with the case body 102a by TIG (Tungsten Inert Gas) welding. In this way, a fluid receiving space is formed inside the main body case 102. The base plate 102b is provided with fixing parts 102c respectively formed in a recessed part for attaching and fixing the inflow pipe 105 and the outflow pipes 106.

A holder member 109 is comprised of two members which are a main body fixed plate 109a to be fixed to the main body case and a stator fixed plate 109b having a fixed part which is fixed to the stator (not shown). The two members are assembled and integrated together as described below to constitute the holder member 109. The holder member 109 is temporarily fixed to the prescribed positions of the main body case 102 respectively in such a manner that the main body fixed plate 109a abuts the base plate 102b of the main body case 102 and the stator fixed plate 109b abuts the outer peripheral face of the stator. After that, the holder member 109 is completely fixed to the main body case 102 by means of brazing. The holder member 109 is not fixed by brazing but by a screw to the stator.

Figure 4:
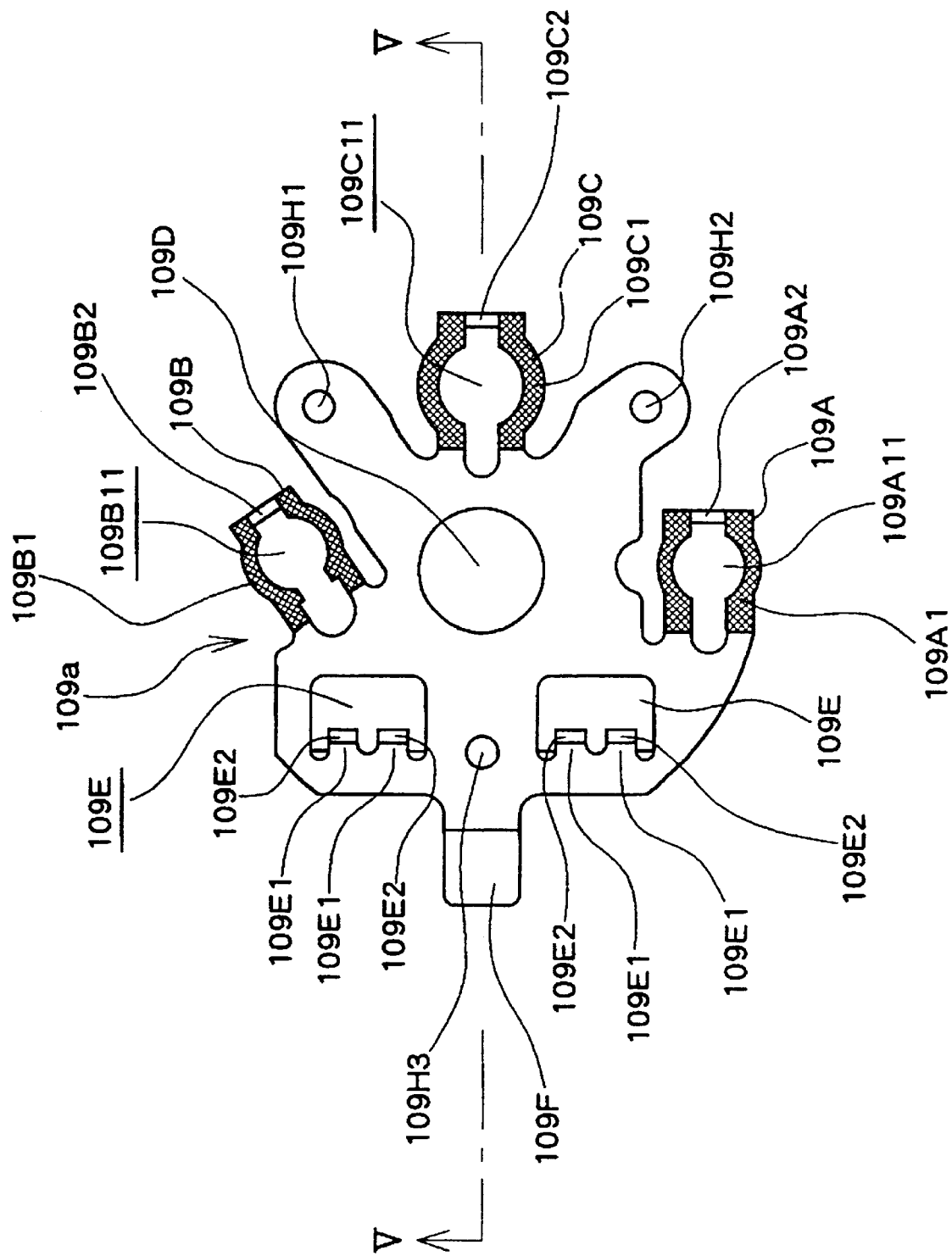
FIG. 4 is a side view of a main body fixed plate which is one part of a holder member of the valve opening/closing drive device in FIG. 3 and being taken in the direction of arrow IV.
Figure 5:
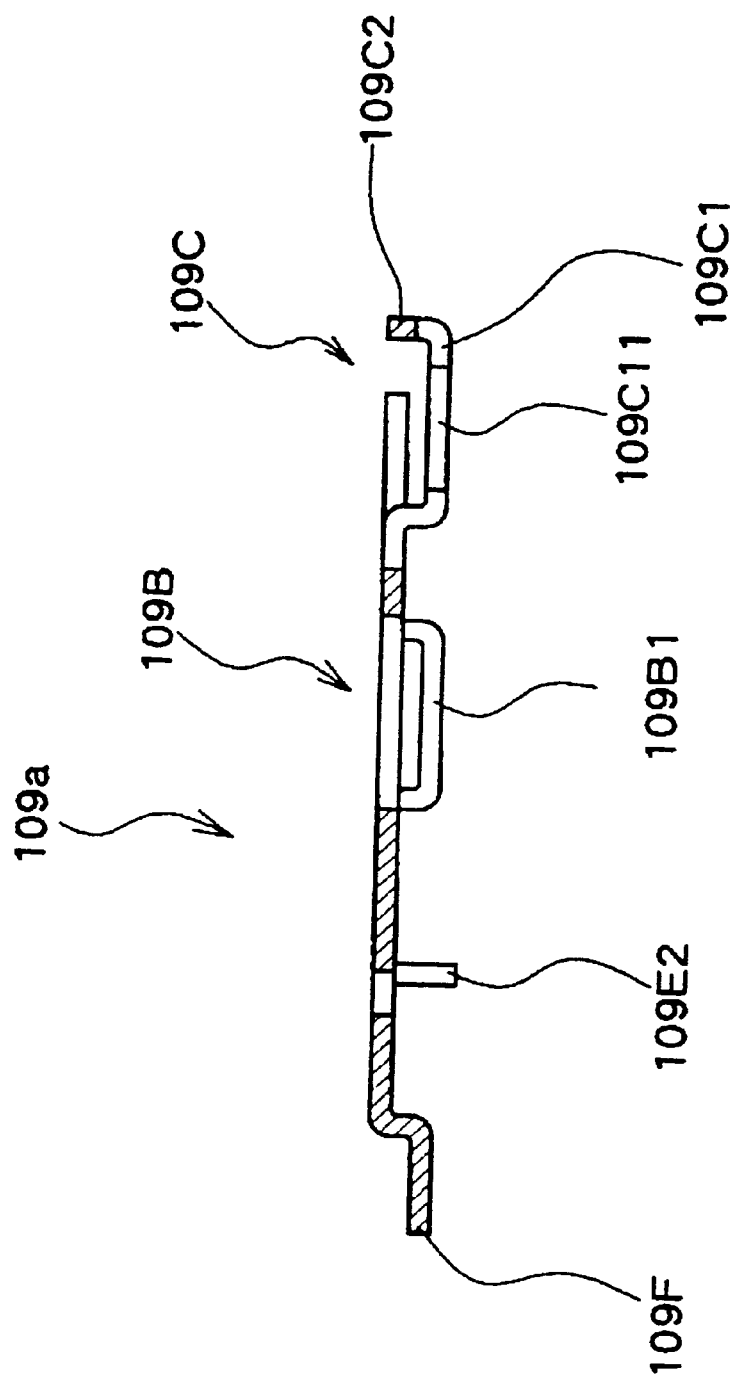
FIG. 5 is a cross-sectional view of the main body fixed plate taken on line V—V in FIG. 4.

FIG. 4 is a plan view showing the main body fixed plate 109a taken in the direction of arrow IV in FIG. 3. FIG. 5 is a cross-sectional view taken on the line V—V in FIG. 4.

The main body fixed plate 109a shown in FIGS. 4 and 5 is provided with an inflow pipe fixing part 109A having a passing-through hole 109A11 for passing the inflow pipe 105 through. The inflow pipe fixing part 109A is provided with a separated abutting part 109A1 which is separated from the fixing part 102c formed on the base plate 102b of the main body case 102 by a prescribed dimension (see "L1" in FIG. 3) and which has the passing-through hole 109A11 for abutting the outer peripheral face of the inflow pipe 105, and a receiving face part 109A2 for abutting against the base plate 102b.

Accordingly, the inflow pipe 105 can be temporarily held in the main body case 102 on which the holder member 109 is mounted by putting the inflow pipe 105 to the fixing part 102c of the main body case 102. In the case of this temporary holding, the end part of the inflow pipe 105 abuts against the fixing part 102c of the base plate 102b which is formed in a stepped shape, the outer peripheral surface of the end part abuts the inner peripheral surface of the fixing part 102c where the inflow pipe 105 is inserted, and further the inflow pipe fixing part 109A of the holder member 109 abuts against the inflow pipe 105 at an apart position from these abutting portions. The temporary holding of the inflow pipe 105b is securely performed by abutting at three positions as described above. That is, this inflow pipe fixing part 109A is used as a fixing part of the inflow pipe 105 as well as a temporary holding part at the time of assembly.

Besides, when the inflow pipe 105 is bent after the holder member 109a has completely fixed by brazing (see brazing positions N in FIG. 3), the stress occurred due to the bending is held by the inner peripheral surface of the passing-through hole 109A 11 as well as the attaching portion of the fixing part 102c. As a result, the possibility of which cracks may occur in the fixing part 102c due to the stress caused by bending of the inflow pipe 105 after attaching can be prevented.

The main body fixed plate 109a shown in FIGS. 4 and 5 is provided with outflow pipe fixing parts 109 B and 109C respectively having passing-through holes 109B11 and 109C11 for passing two outflow pipes 106 through. Respective outflow pipe fixing parts 109B and 109C are provided with separated abutting parts 109B1 and 109C1 respectively away from the fixing parts 102c by a prescribed dimension (see "L1" in FIG. 3) and having the passing-through holes 109B11 and 109C11 to abut the outer peripheral face of the outflow pipes 106, and receiving face parts 109B2 and 109C2 to abut with the base plate 102b.

By this construction, as similarly in the case of the inflow pipe 105, the outflow pipes 106 can be temporarily held in the main body case 102 by inserting the outflow pipes 106 into the fixing parts 102c of the main body case 102. In this temporary holding, the outflow pipe 106 abuts against the fixing part 102c and the outflow pipe fixing part 109B or 109C of the holder member 109, and thus the temporary holding of the outflow pipe 106 is performed more securely.

Besides, since the holder member 109a is completely fixed by brazing, the stress occurred by the bending is held by the inner peripheral surface of the passing-through hole 109B11 or 109C11 as well as the fixing part 102c even when the outflow pipes 106 are bent. As a result, the possibility of which cracks may occur in the fixing part 102c due to the stress caused by bending of respective outflow pipes 106 after attaching can be prevented.

At a center part of the main body fixed plate 109a in FIG. 4, a hole 109D is formed for passing the fixed shaft 113 through that is press-fitted and fixed to the base plate 102b of the main body case 102. Generally rectangular holes 109E are formed in the main body fixing part 109a shown in FIG. 4. Two projections 109E2 are respectively formed at the tip part of protruding parts 109E1 by bending about 90 degrees, which are protruded on the inner side of the hole 109E. These two projections 109E2 are inserted into an engaging hole 109J1 formed in the stator fixing part 109b.

A planar protrusion 109F protruding on the light side is formed at the left end of the main body fixed plate 109a shown in FIGS. 4 and 5. The protrusion 109 F is inserted transverse with respect to an opening part formed in the stator fixing part 109b.

A tongue piece is extended outside between the both outflow pipe fixing parts 109 B and 109C. A hole 109H1 for temporary holding is formed in the tongue piece to which a projection (not shown) formed on the base plate 102b of the main body case 102 is fitted. Another tongue piece is formed extended outside between the outflow pipe fixing part 109C and the inflow pipe fixing part 109A. A hole 109H2 for temporary holding is formed in the tongue piece to which a projection (not shown) formed on the base plate 102b of the main body case 102 is fitted. Also, a hole 109H3 for temporary holding is formed between the both holes 109E. The holes 109H1, 109H2 and 109H3 for temporary holding are used as the support parts supported by the main body case 102 because the holder member 109 is temporarily held in a positioned state and then fixed by brazing.

Figure 6:
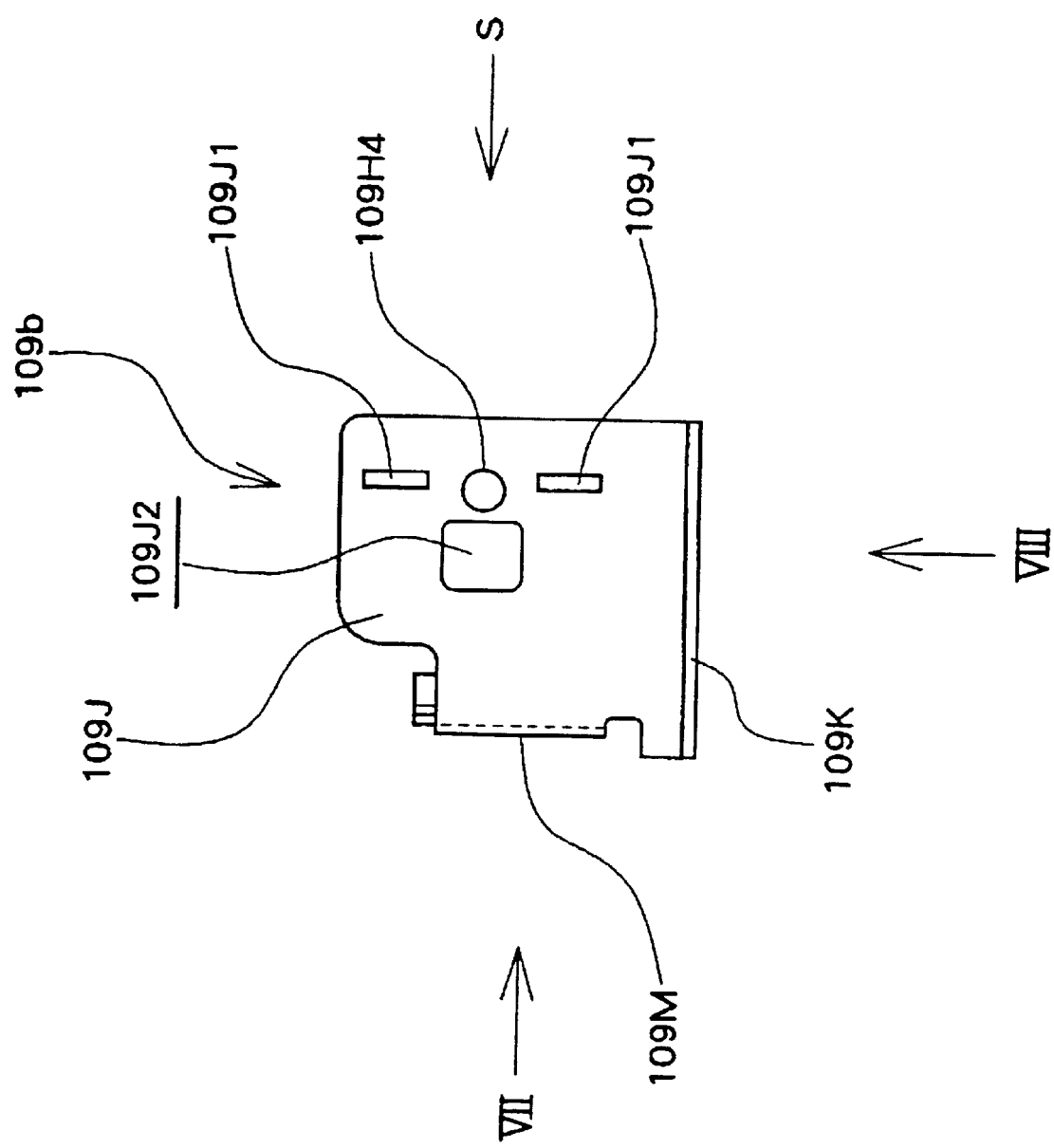
FIG. 6 is a side view of a stator fixed plate which is another part of the holder member of the valve opening/closing drive device in FIG. 3 and being taken in the direction of arrow IV.
Figure 7:
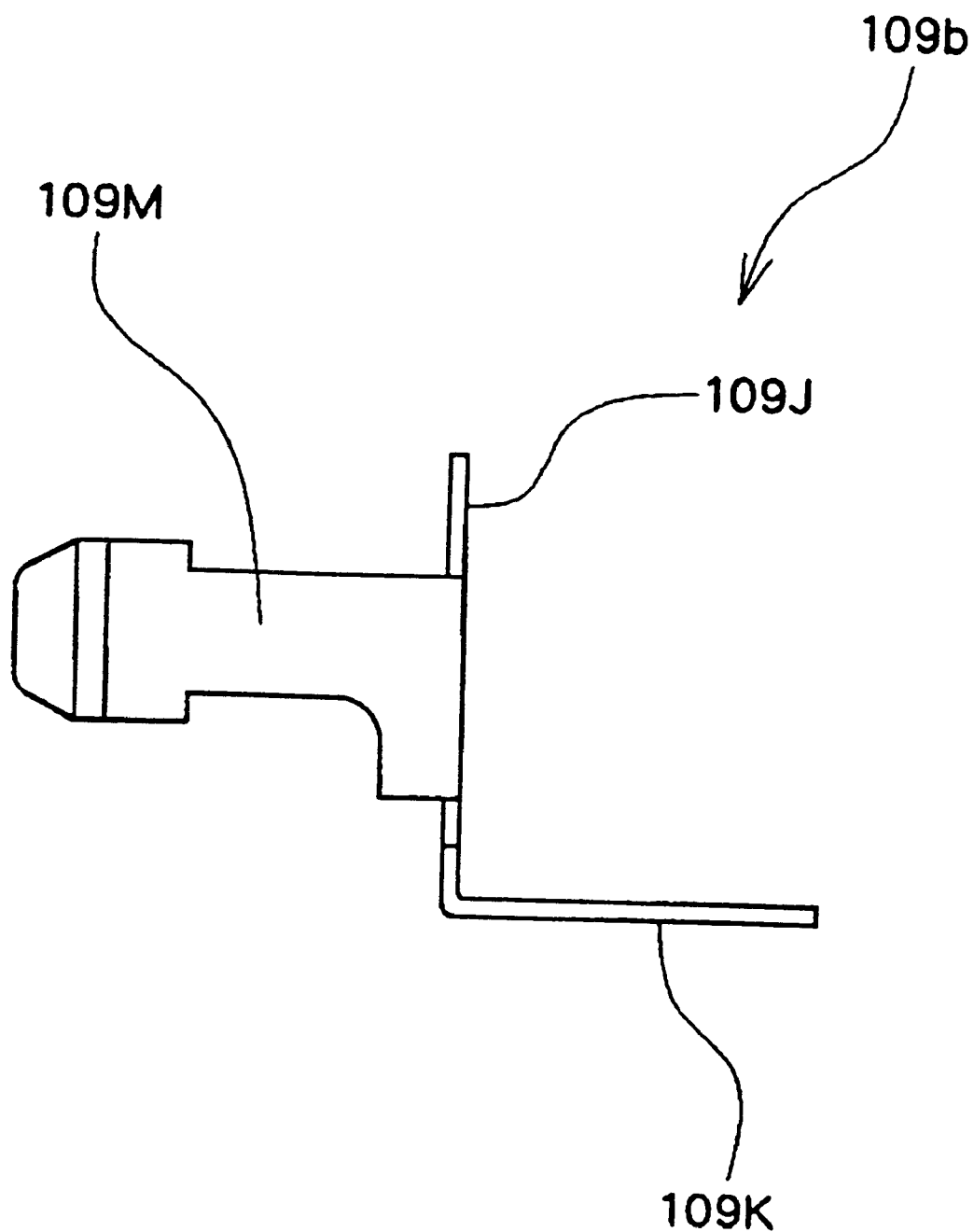
FIG. 7 shows the stator fixed plate taken in the direction of arrow VII in FIG. 6.
Figure 8:
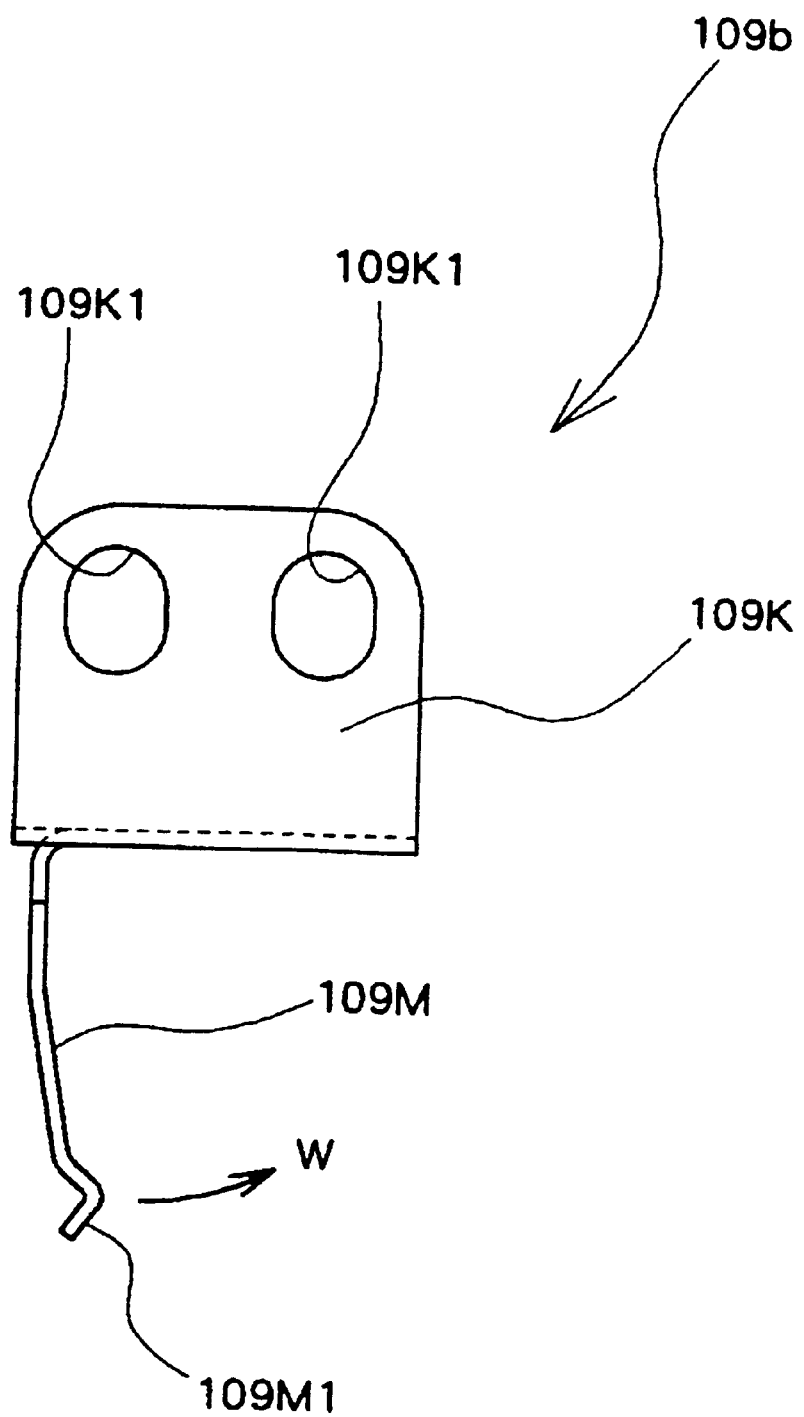
FIG. 8 shows the stator fixed plate taken in the direction of arrow VII in FIG. 6.

FIG. 6 is a plan view showing the stator fixed plate 109b of the holder member 109. FIG. 7 is a side view taken in the direction of arrow VII in FIG. 6. FIG. 8 is a front view taken in the direction of arrow VIII in FIG. 6.

The stator fixed plate 109b shown in FIGS. 6 to 8 is provided with a first attaching face part 109J for attaching the main body fixed plate 109a, a second attaching face part 109k having attaching holes 109k1 for mounting the valve opening/closing drive device 101 with the holder member 109 to another equipment, and a stator mounting part 109M for mounting the holder member 109 to the stator (not shown).

The first attaching face part 109J has two engaging holes 109J1 to which the projections 109E2 of the main body fixed plate 109a are inserted. The attaching face 109J is provided with a inserting hole 109J2 for being inserted by the protrusion 109 F of the main body fixed plate 109a in the transverse direction (direction of arrow S in FIG. 6). Two of the projections 109E2 of the main body fixed plate 109a are respectively fitted into the two engaging holes 109J1 and the protrusion 109 F of the main body fixed plate 109a is inserted into the inserting hole 109J2 from the side to form the holder member 109 that the main body fixed plate 109a and the stator fixed plate 109b are integrated with each other. The first attaching face part 109J is provided with a hole 109H4 for temporary holding which overlaps the hole 109H3 for temporary holding of the main body fixed plate 109a when the main body fixed plate 109a and the stator fixed plate 109b are integrated with each other.

The second attaching face part 109k for attaching the valve opening/closing drive device 101 to other equipment is formed so as to bend at the end part of the attaching face part 109J in generally perpendicular direction. The attaching face part 109k is provided with two attaching holes 109k1.

The stator mounting part 109M is formed so as to bend at the end part of attaching face part 109J in generally perpendicular direction. The stator mounting part 109M is elastic to apply a biasing force in the direction of arrow W in FIG. 8. The tip end part of the stator mounting part 109M is provided with a protrusion 109M1, which is shaped like a character "v" in the direction of arrow W. The protrusion 109M1 elastically fits into an engaging portion of the stator as a fixed part of the stator fixed plate 109b to the stator.

As described above, the holder member 109 of the valve opening/closing drive device 101 in the second embodiment of the present invention is constituted of the two members, i.e., the main body fixed plate 109a and the stator fixed plate 109b. The holder member 109 is provided with the inflow pipe fixing part 109A and the two outflow pipe fixing parts 109B and 109C that are used as the engaging parts for respectively engaging with the one inflow pipe 105 and the two outflow pipes 106. Accordingly, the stator 71 (see FIG. 12) is precisely positioned by the holder member 109 with respect to the main body case 102 and thus high positional accuracy between the stator part and the rotor 172 is attained and the motor characteristic is improved.

A modified example of the second embodiment will be described below with reference to FIGS. 9 to 12. In the following modified example, the main body fixing part 109a of the holder member 109 is similarly used as the second embodiment and a stator fixed plate 110 is modified from the stator fixed plate 109b. Therefore, the stator fixed plate 110 is mainly described as follows.

Figure 9:
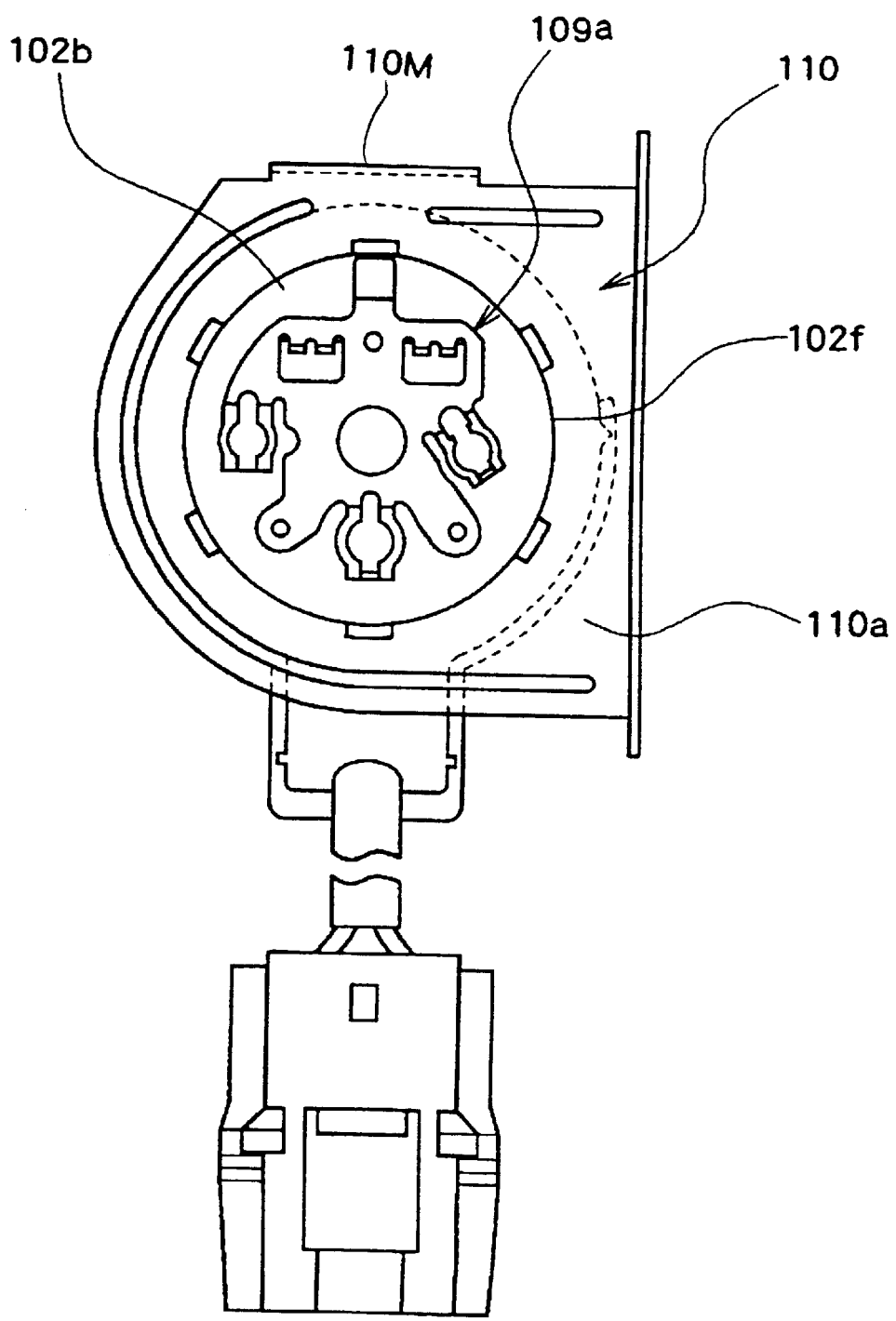
FIG. 9 is a plan view that shows a modified holder member in accordance with the second embodiment.

As shown in FIG. 9, the main body fixed plate 109a is attached and fixed on the base plate 102b of the main body case 102 in a positioned state. The stator fixed plate 110 provided with a stator mounting part 110M is press-fitted and fixed on the outer periphery face of the mechanism receiving portion 102a2 of the case body 102a, which constitutes the main body case 102 together with the base plate 102b, for positioning the main body case 102 and the stator 71 (see FIG. 12) with high precision.

Figure 10:
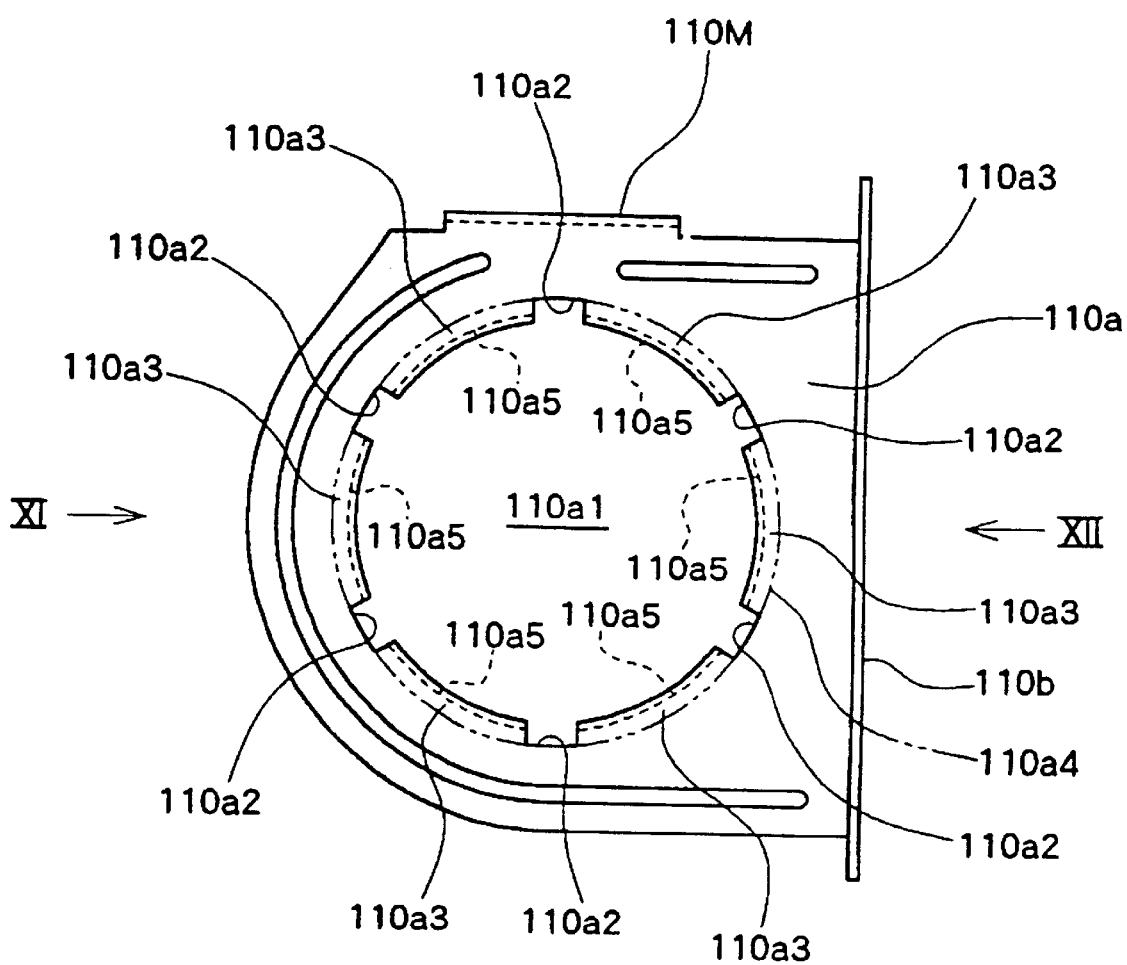
FIG. 10 is a plan view of a stator fixed plate that is one part of the holder member shown in FIG. 9.
Figure 11:
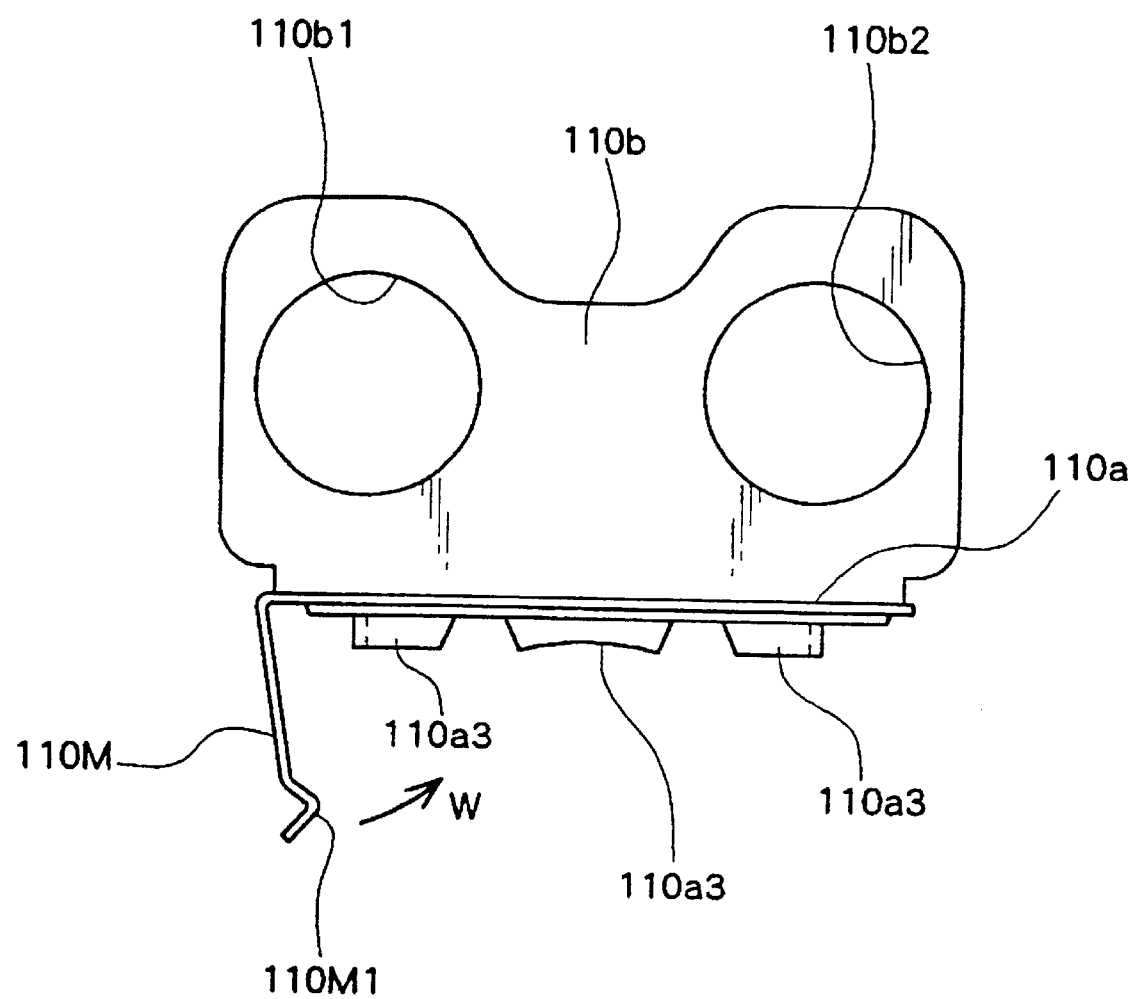
FIG. 11 is a side view of the stator fixed plate taken in the direction of arrow XI in FIG. 10.

FIG. 10 is a plan view of the stator fixed plate 110. As shown in FIGS. 10 and 11, the stator fixed plate 110 is provided with a main body attaching face part 110a for mounting on the outer peripheral face of the mechanism receiving portion 102a2 of the main body case 102a by utilizing a hole 110a1 with a large diameter (see FIG. 10), an other-member attaching face part 110b having attaching holes 110b1 and 110b2 for being mounted to another equipment or the like, and a stator mounting part 110M for mounting the stator fixed plate 110 to the stator 71.

As shown in FIG. 10, the main body attaching face part 110a is provided with the hole 110a1 with a large diameter for arranging the main body fixed plate 109a on its inner side. Bent parts 110a5 are formed at the edge of the hole 110a1 by bending about 90 degrees with respect to the surface of the main body attaching face 110a by press molding. The inner peripheral surfaces of respective bent parts 110a5 are abutted with the outer peripheral face of the mechanism receiving portion 102a2 of the main body case 102a and the stator fixed plate 110 is press-fitted and fixed to the main body case 102a.

Slits 110a2 are formed between the base parts 110a3 of the respective bent parts 110a5. The base part 110a3 of each bent part 110a5 protrudes inside of the circle 110a4, which indicates the most outer peripheral part of the slit 110a2. The protruding section which is the welded part of the base plate 102b and the main body case 102a of the main body case 102 is placed on the inner peripheral sides of the protruded base parts 110a3. The stator fixed plate 110 is fixed to the main body case 102 by the portion where the protruding section of the main body case 102 is placed on the base part 110a3 of the stator fixed plate 110.

Further, as shown in FIG. 11, an attaching face part lob for attaching the valve opening/closing drive device 101 to other equipment is formed bent from the main body attaching face part 110a in generally perpendicular direction and provided with two attaching holes 110b1.

Figure 12:
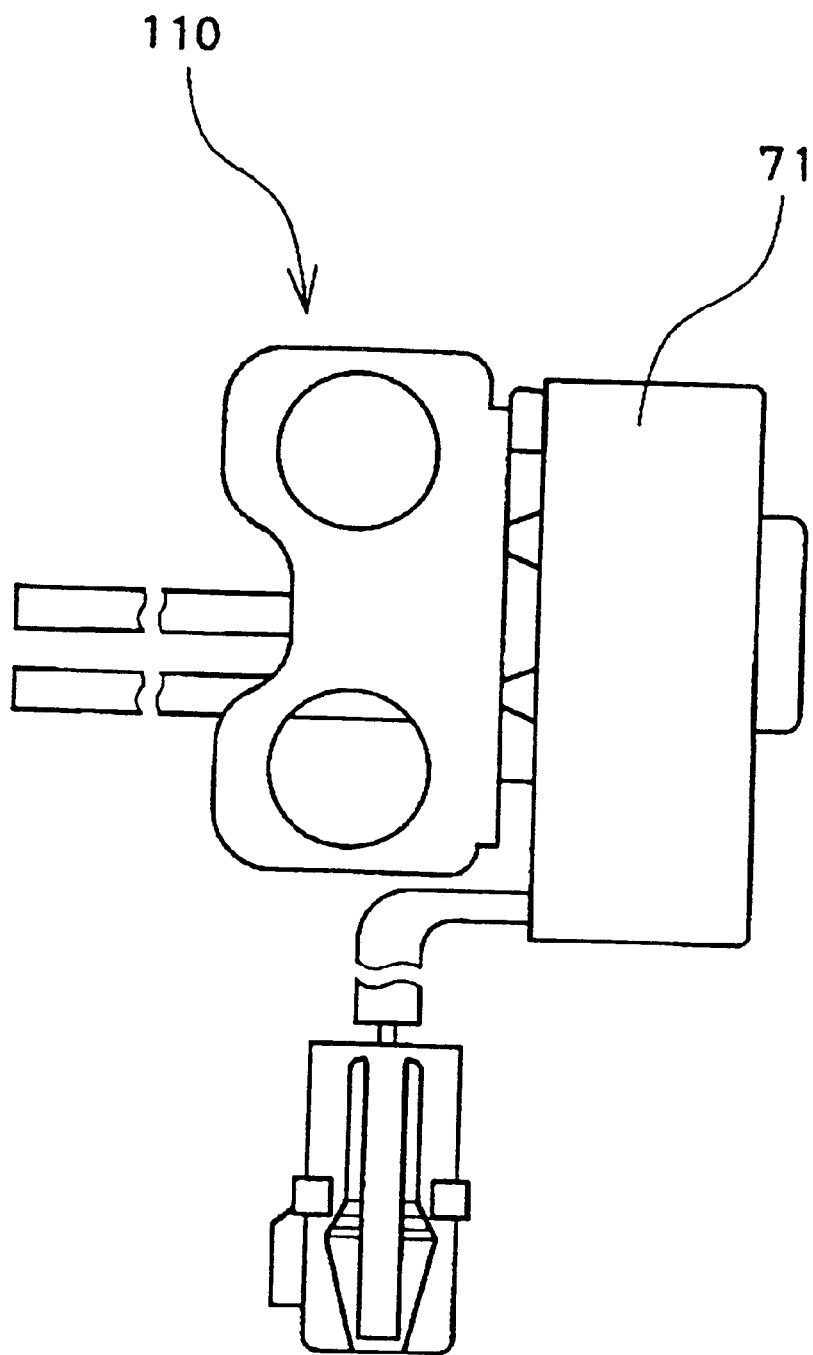
FIG. 12 is a side view showing the stator fixed plate that is mounted to the stator and taken in the direction of arrow XII in FIG. 10.

The stator mounting part 110 M is formed bent in generally perpendicular direction from the end part of the main body attaching face 110a. The stator mounting part 110 M is elastic to apply a biasing force in the direction of arrow W in FIG. 11. The tip part of the stator mounting part 110M is provided with a protrusion 110M1 that is used as a fixing part to fix the stator 71. FIG. 12 shows the stator 71 mounted with the stator fixed plate 110.

Next, a valve opening/closing drive device according to a third embodiment of the present invention will be described below with reference to FIGS. 13 and 14. In the third embodiment, only a holder member that is a feature part of the invention is described.

Figure 13:
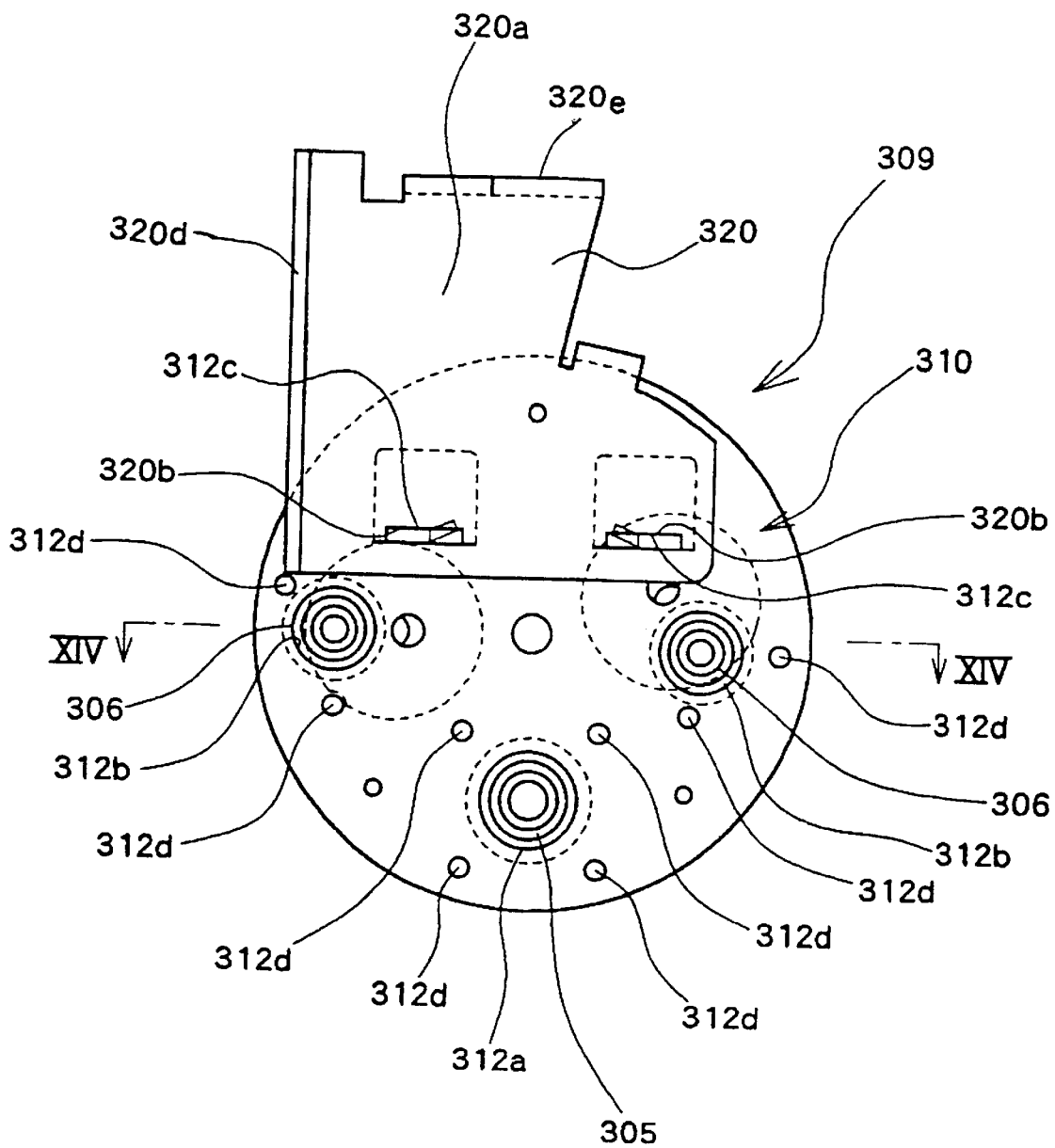
FIG. 13 is a plan view that shows a holder member of a valve opening/closing drive device in accordance with a third embodiment of the present invention.
Figure 14:
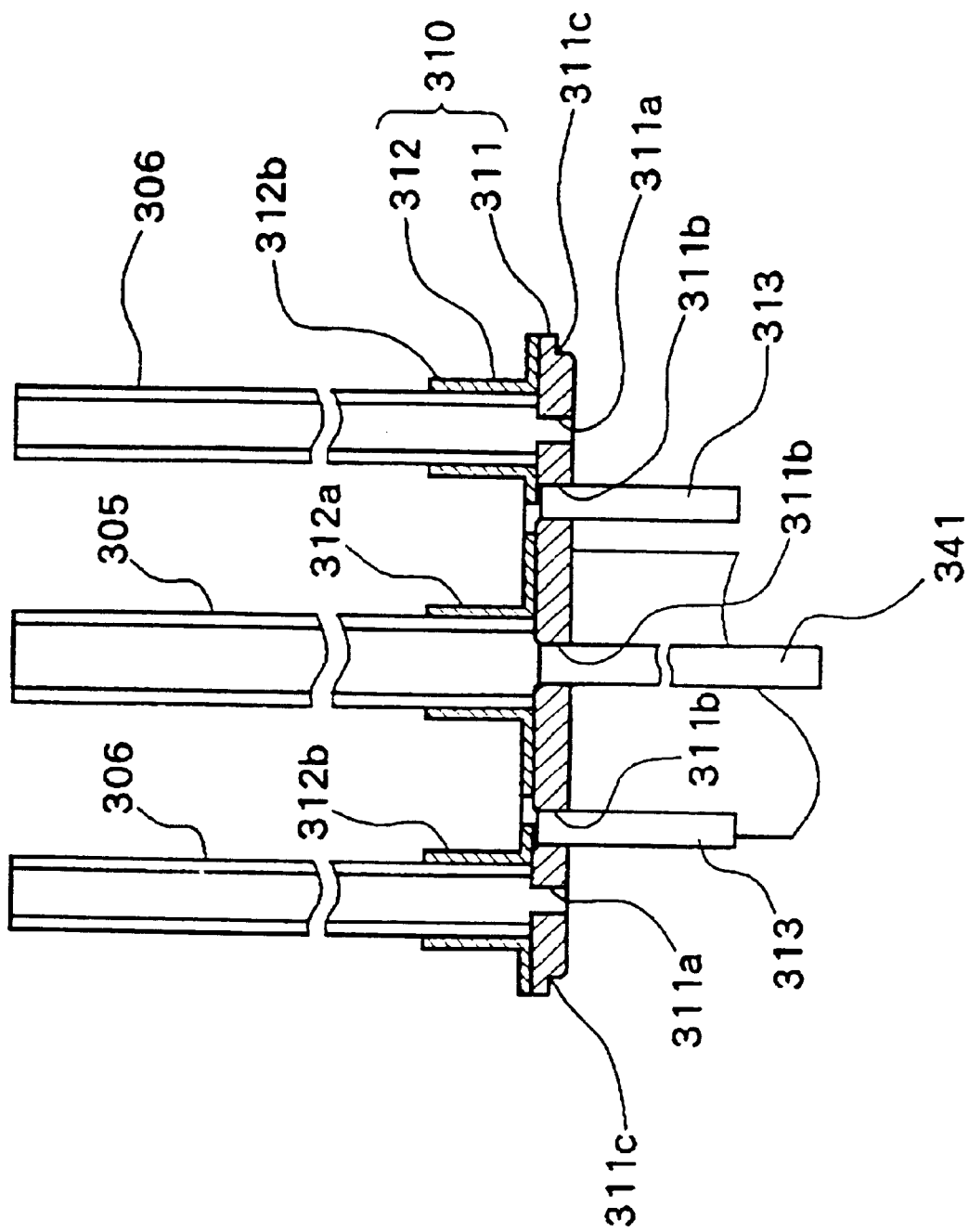
FIG. 14 is a cross-sectional view which shows the holder member taken on line XIV—XIV in FIG. 13.

As shown in FIGS. 13 and 14, the holder member 309 is constituted of a main body mounting part 310 composed of two stacked members and a stator fixing part 320 attached to a pipe fixing holder 312 of the main body mounting part 310.

The main body mounting part 310 is constituted of a shaft fixed holder 311 (see FIG. 14) formed of a generally circular plate member and a pipe fixing holder member 312 placed on the shaft fixed holder 311 and fixed by brazing. The shaft fixed holder 311 is made of a SUS material and provided in a prescribed position with a hole 311a which is an aperture for a fluid passing through, and push-in holes 311b for press-fitting and fixing the one end of fixed shafts 313, 313 and 341 for supporting gears and the like constituting a mechanism part (not shown) to open or close the outflow pipes 306 in such a manner that the each end part of the shafts does not protrude from the hole.

A stepped part 311c is formed in the outer periphery part of the shaft fixed holder 311. The stepped part 311c is an engaging part fitted to the outer end of the main body case (not shown) used for the fluid receiving space part of the valve opening/closing drive device. The holder member 309 and the main body case form an inside space portion shut tightly by the stepped part 311c fitted into and welded with the main body case.

Instead of forming the stepped part 311c, a stepped part may be formed with the shaft fixed holder 311 and the pipe fixing holder member 312 by making the outer periphery part of the holder member 312 protrude outside of the outer periphery end of the shaft fixed holder 311 and the outer periphery part of the main body case may be fitted to the stepped part.

The pipe fixing holder member 312 is provided with a tube part 312a to which one end of an inflow pipe 305 is press-fitted for passing a fluid into the valve opening/closing drive device. The holder member 312 is also provided with tube parts 312b, 312b to which each one end of two outflow pipes 306 is press-fitted for passing the fluid outside from the valve opening/closing drive device. Each of the inflow pipe 305 and the outflow pipes 306, 306 is fitted into the respective press-fitting tube parts 312a, 312b and 312b, and the holder member 312 and the shaft fixed holder 311 are brazed to integrate the holder member 312, the inflow pipe 305, the two outflow pipes 306 and the shaft fixed holder 311 with each other. That is, the press-fitting tube parts 312b, 312b of the holder member 312 is used as a temporary holding part for the inflow pipe 305 and the outflow pipes 306 and 306, and further used as a fixing part after fixed by brazing.

In addition, the brazing metal flows into the clearance between the fixed shafts 313, 313 and 341 and the push-in holes 311b respectively press-fitted by the shafts. The main body mounting part 310 consisting of the holder member 312 and the shaft fixed holder 311 is securely positioned and fixed to each of the fixed shafts 313, 313 and 341. A plurality of brazing confirmation holes 312d are formed so as to surround each of the press-fitting tube parts 312a and 312b of the holder member 312. A worker in charge of assembly using brazing can confirm whether the brazing metal sufficiently exist or not between the holder member 312 and the shaft fixed holder 311 by checking the brazing metal through the hole 312d. The holder member 312 is provided with support parts supported by the main body case with a structure similar as the second embodiment (not shown).

The holder member 312 is provided with engaging protrusion parts 312c and 312c which are respectively fitted into two engaging holes 320b formed in the stator fixing part 320. The engaging protrusion parts 312c, 312c are inserted into the engaging holes 320b respectively and the respective tip ends of the engaging protrusion parts 312c, 312c are bent so that the main body mounting part 310 and the stator fixing part 320 are integrated with each other.

The stator fixing part 320 is provided with the engaging holes 320b serving as the engaging part with the main body mounting part 310, an attaching face part 320a attached to the main body mounting part 310 extending outward from the outer periphery of the main body mounting part 310, an attaching face part 320d formed bent upward about 90 degrees (near side of the paper in FIG. 13) with respect to the attaching face part 320a for attaching to other equipment, and a stator attaching face part 320e formed bent downward about 90 degrees (far side of the paper in FIG. 13) with respect to the attaching face part 320a.

Next, a valve opening/closing drive device according to a fourth embodiment of the present invention will be described below with reference to FIGS. 15, 16 and 17. In the fourth embodiment, a holder member is described as follows.

Figure 15:
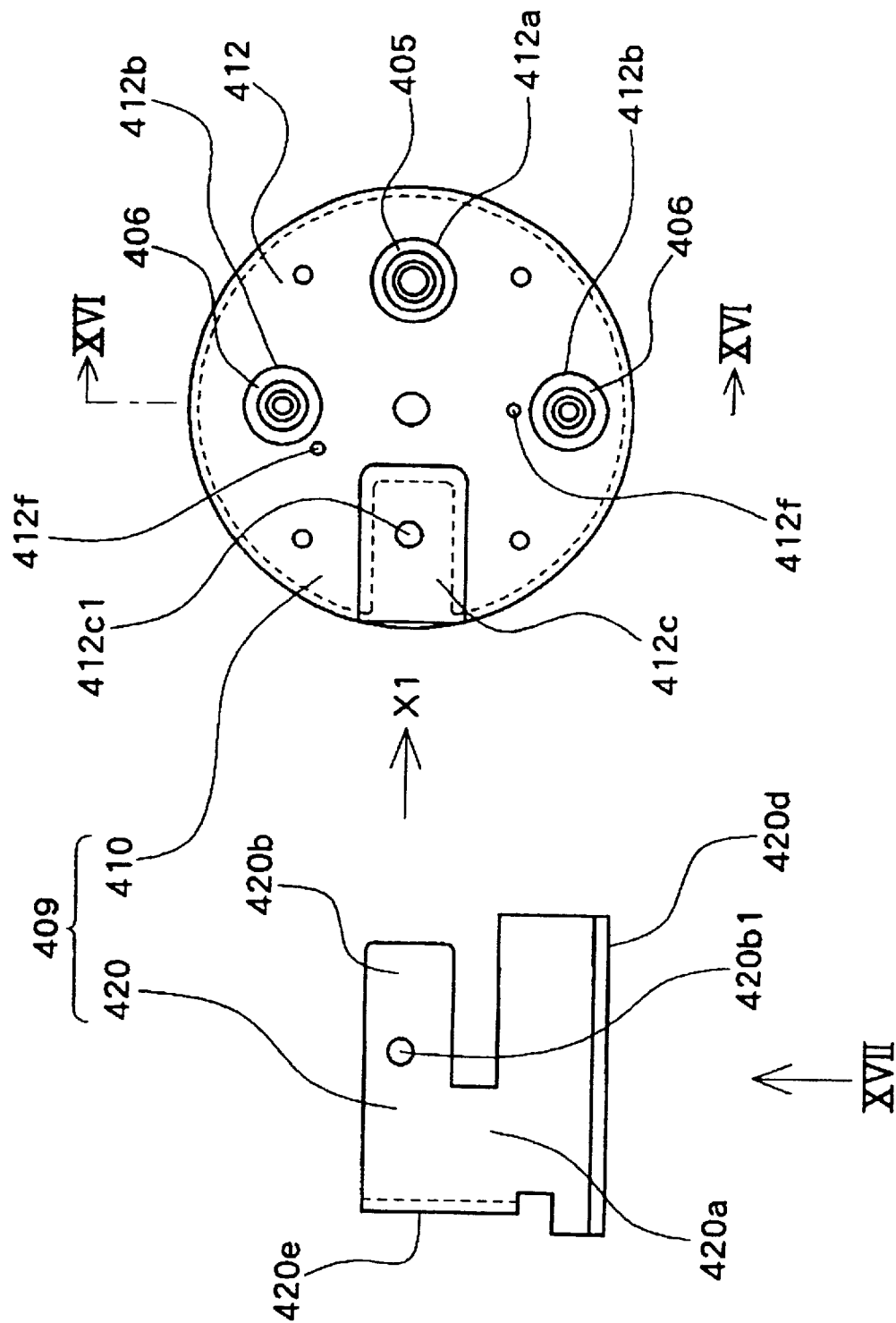
FIG. 15 is a plan view that shows an assembling process of a holder member of a valve opening/closing drive device in accordance with a fourth embodiment of the present invention.
Figure 16:
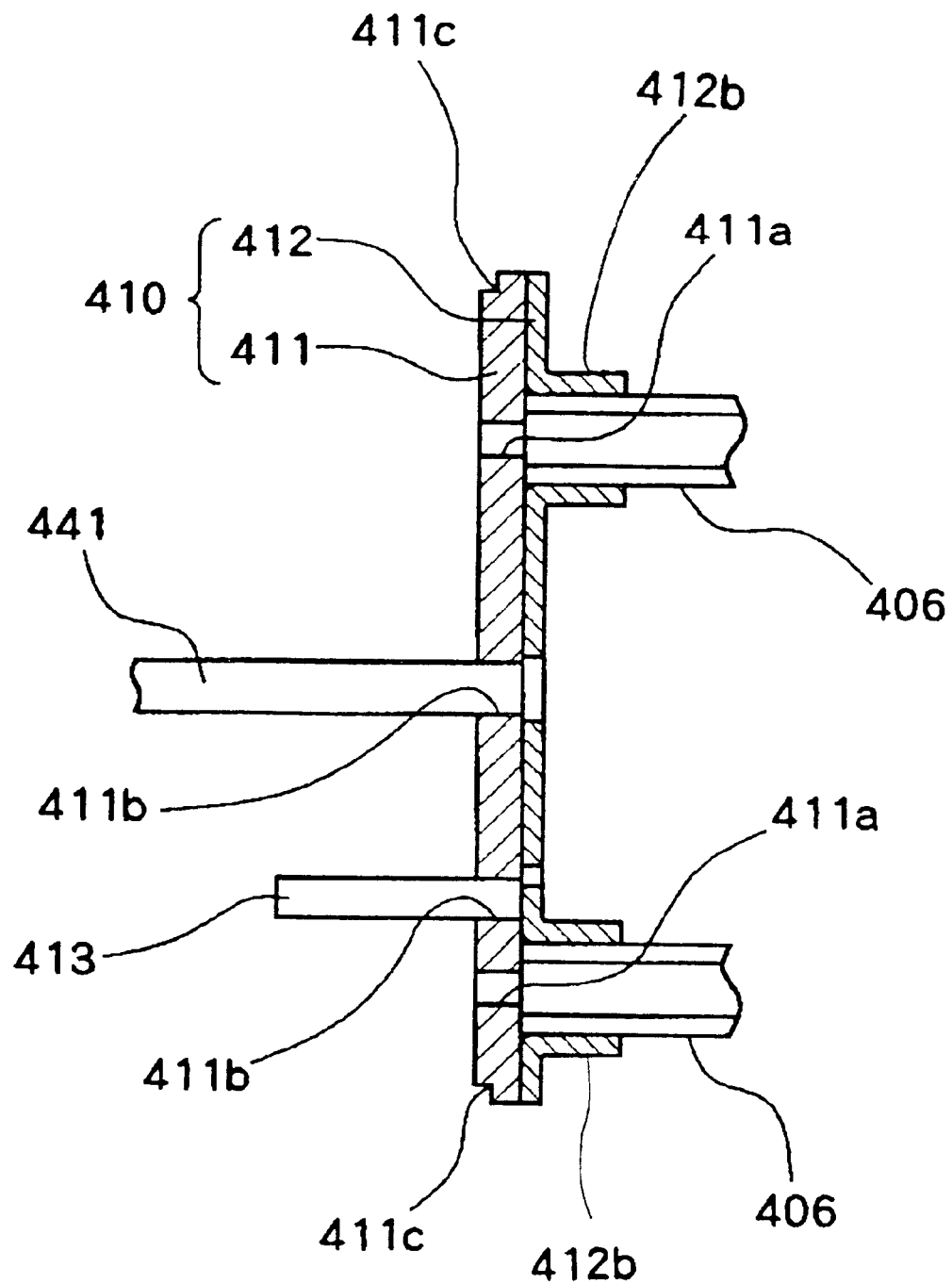
FIG. 16 is a cross-sectional view which shows the holder member taken on line XVI—XVI in FIG. 15.
Figure 17:
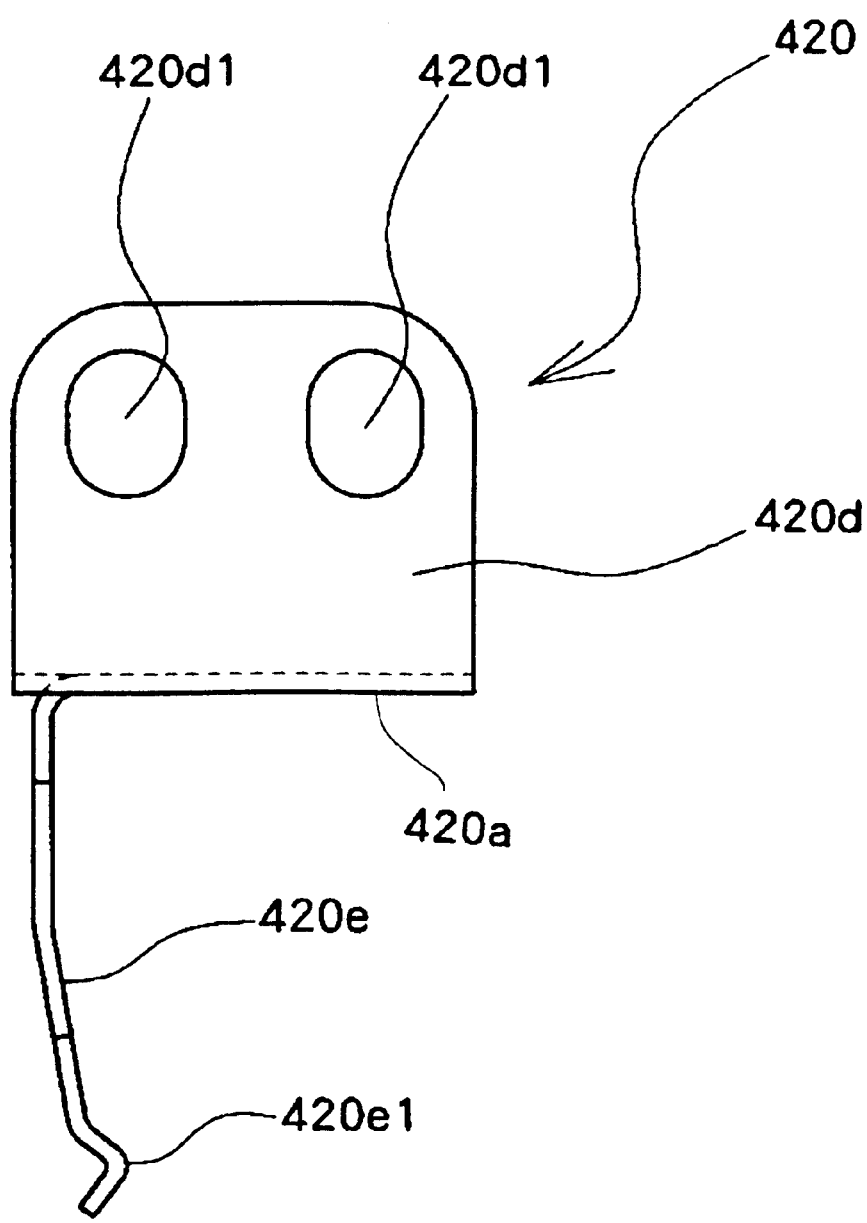
FIG. 17 shows the stator fixing part of the holder member in FIG. 15, taken in the direction of arrow XII.
Figure 18:
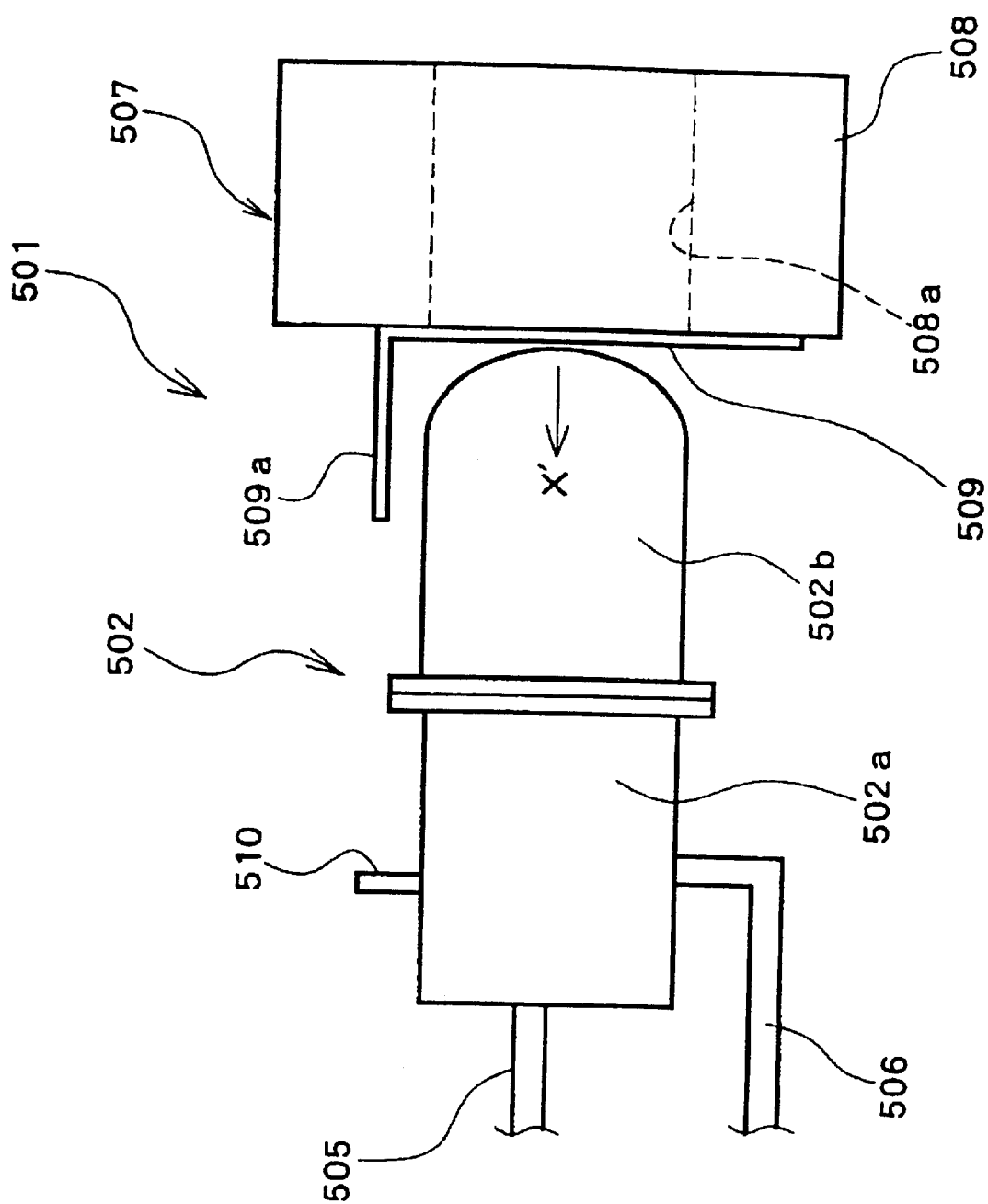
FIG. 18 is a plan view that shows a conventional valve opening/closing drive device before a stator case is assembled to a main body case.

As shown in FIGS. 15 and 16, a holder member 409 is constituted of a main body mounting part 410 composed of two stacked members and a stator fixing part 420 attached to a pipe fixing holder 412 of the main body mounting part 410.

The main body mounting part 410 is constituted of a shaft fixed holder 411 (see FIG. 16) formed of a generally circular plate member and the pipe fixing holder 412 placed on the shaft fixed holder 411 and fixed by brazing. The shaft fixed holder 411 is made of a SUS material and provided in a prescribed position with a hole 411a which is an aperture for a fluid passing through, and push-in holes 311b for press-fitting and fixing the one end of fixed shafts 413 and 441 for supporting gears and the like constituting a mechanism part (not shown) to open or close the outflow pipes 406 in such a manner that each end of the shafts does not protrude from the hole.

A stepped part 411c is formed in the outer periphery part of the shaft fixed holder 411. The stepped part 411c is an engaging part fitted to the outer end of the main body case (not shown) used for the fluid receiving space part of the valve opening/closing drive device. The holder member 409 and the main body case form an inside space portion being shut tightly by the stepped part 411c fitted to the main body case.

Instead of forming the stepped part 411c, a stepped part may be formed using the shaft fixed holder 411 and the pipe fixing holder 412 with the outer periphery part of the holder 412 protruding outside the outer periphery end of the shaft fixed holder 411, and the outer periphery part of the main body case may be fitted to the stepped part.

The pipe fixing holder 412 is provided with a tube part 412a to which an inflow pipe 405 is press-fitted for flowing a fluid into the valve opening/closing drive device and tube parts 412b, 412b to which each of two outflow pipes 406 is press-fitted for flowing the fluid outside. Each of the inflow pipe 405 and the outflow pipes 406 is press-fitted into the respective tube parts 412a, 412b and 412b, and the pipe fixing holder 412 and the shaft fixed holder 411 are brazed to integrate the holder 412, the inflow pipe 405, the two outflow pipes 406 and the shaft fixed holder 411 with each other. A brazing metal is injected into a clearance between the pipe fixing holder 412 and the shaft fixed holder 411 through injection holes 412f and 412f which are disposed respectively near the outflow pipes 406.

The brazing metal flows into the push-in holes 411b respectively press-fitted by the fixed shafts 413 and 441, and the main body mounting part 410 consisting of the holder 412 and the shaft fixed holder 411 is securely positioned and fixed to each of the fixed shafts 413 and 441. The pipe fixing holder 412 is provided with support portions supported by the main body case (not shown).

The pipe fixing holder 412 is provided with a flat-hole shaped frame part 412c to which a tongue piece 420b formed in the stator fixing part 420 can be inserted. The tongue piece 420b of the stator fixing part 420 is inserted into the flat-hole shaped frame part 412c in the direction of arrow X1 in FIG. 15. A protrusion part 420b1 formed on the tongue piece 420b is fitted into a recessed part 412c1 formed in the flat-hole shaped frame part 412c. Thus, the main body mounting part 410 and the stator fixing part 420 are integrated with each other.

The stator fixing part 420 is provided with an attaching face part 420a attached to the main body mounting part 410 extending outward from the outer periphery of the main body mounting part 410, and an attaching face part 420d formed bent upward about 90 degrees (near side of the paper in FIG. 15) with respect to the attaching face part 420a for attaching to another equipment The stator fixing part 420 is also provided with a stator attaching face part 420e formed bent downward about 90 degrees (far side of the paper in FIG. 15) with respect to the attaching face part 320a. The stator attaching face part 420e is provided with a protrusion 420e1 that is a fixing part to the stator, which protrudes on the stator side and fitted to a stepped part formed in a stator case for receiving the stator.

Although the present invention has been shown and described with reference to specific preferred embodiments, various changes and modifications will be apparent to those skilled in the art from the teachings herein.

For example, in the first embodiment described above, the aperture 3 may be opened or closed directly by the slide movement of the valve element 4 without the boss member 51. Further, the tip member of the valve element 4 may be replaced with a member other than the needle valve 45.

In the first embodiment, the holder member 9 is fixed to the stator case 8 with a screw, but other fixing method can be used. Further, the flat surface part 91 of the holder member 9 may be so constituted as to have no preventing portion from expanding of the main body case 2. When the holder member 9 is positioned with respect to the main body case 2 by the tubular parts 9a, 9b fitted to at least two of the pipes 5, 6 of the main body case 2 and the stator case 8 is fixed, other discrete positioning constitution is not necessary.

As described above, the valve opening/closing drive device according to the present invention is capable of temporarily holding the inflow or outflow pipe surely by means of the temporary holding part even when the main body case is not so thick such as a press molding product. Accordingly, an inexpensive material and an inexpensive manufacturing method can be adopted to reduce the manufacturing cost.

Further, in the valve opening/closing drive device according to the present invention, the holder member having the fixing part for fixing a stator is provided with the support part supported by the main body case. Therefore, even when the valve element is constituted of a member such as a ball valve or a disc, which is easy to produce a positional deviation in a rotating direction, the main body case and the stator can be positioned surely.

Moreover, the clearance between the rotor part rotatably disposed within the main body case and the stator part placed outside of the main body case can be kept constant and thus the rotational torque of the rotor can be stabilized.

What is claimed is:

1. A valve opening/closing drive device, comprising:
    a main body case formed by press molding and connected respectively with an inflow pipe and an outflow pipe;
    a valve element provided within the main body case for opening and closing an opening part;
    a motor having a stator part placed on the outside of the main body case and a rotor part positioned inside of the main body case and opposite to the stator part for opening and closing the valve element; and
    a holder member supported by the main body case and provided with a temporary holding part for temporarily holding the inflow pipe or the outflow pipe when the pipes are joined with the main body case.

2. The valve opening/closing drive device according to claim 1, wherein the holder member is provided with a fixing part for positioning and fixing the stator part.

3. The valve opening/closing drive device according to claim 1, wherein the main body case is provided with aperture parts connected respectively with the inflow pipe and the outflow pipe, and wherein the holder member is provided with a tubular part which is the temporary holding part and fitted to at least one of the inflow pipe and the outflow pipe and a flat surface part which is placed to overlap the main body case.

4. The valve opening/closing drive device according to claim 3, wherein a ring-shaped boss member is fixed into the aperture part and temporary holding is performed by the boss member and the temporary holding part of the holder member when the inflow pipe or the outflow pipe is joined to the main body case.

5. The valve opening/closing drive device according to claim 1, wherein the main body case is constituted of a first case member and a second case member which are respectively formed of a cup-shaped press drawing work component and opposed to each other, the first case member is provided with aperture parts respectively connected to the inflow pipe and the outflow pipe, the stator part of the motor is fixed on the outside of the trunk part of the second case member and the rotor part is placed in the inner side of the trunk part of the second case member.

6. The valve opening/closing drive device according to claim 1, wherein the valve element is a needle valve.

7. The valve opening/closing drive device according to claim 1, wherein the valve element is a ball valve.

8. The valve opening/closing drive device according to claim 1, wherein the valve element is a circular plate.

9. A valve opening/closing drive device, comprising:
    a main body case connected respectively with an inflow pipe and an outflow pipe;
    a valve element provided within the main body case for opening or closing an opening part;
    a motor including a stator part placed on the outside of the main body case and a rotor part positioned inside of the main body case and opposite to the stator part for opening or closing the valve element; and
    a holder member supported by the main body case and provided with a temporary holding part for temporarily holding the inflow pipe or the outflow pipe when the pipes are joined with the main body case.

10. The valve opening/closing drive device according to claim 9, wherein the main body case includes a case body having an opening part and a base plate which closes up the opening part of the case body and is provided with fixing parts fixing respectively the inflow pipe and the outflow pipe, and the holder member is provided with passing-through holes which abut the outer peripheral face of the inflow pipe or the outflow pipe at a prescribed separate position from the fixing part.

11. The valve opening/closing drive device according to claim 10, wherein the fixing part of the base plate is constituted of a step-like part to be inserted by the end part of the inflow pipe or the outflow pipe, and the step-like part performs a temporary holding in cooperation with the temporary holding part of the holder member when the inflow pipe or the outflow pipe is joined with the main body case.

12. The valve opening/closing drive device according to claim 9, wherein the case body having the opening part includes an approximately cup-shaped press working component having a trunk part, and the stator part abuts and fixes to the outer side of the trunk part of the case body and the rotor part is disposed within the inner side of the trunk part of the case body.

13. The valve opening/closing drive device according to claim 12, wherein the holder member is provided with the temporary holding part, a flat surface part which is placed to overlap the main body case, a stator mounting part for mounting to the stator part, and an attaching face part for attaching to other equipment.

14. A valve opening/closing drive device, comprising:
    a main body case connected respectively with an inflow pipe and an outflow pipe;
    a valve element provided within the main body case for opening or closing an opening part;
    a motor for opening and closing the valve element; and
    a holder member supported by the main body case and provided with a temporary holding part for temporarily holding the inflow pipe or the outflow pipe when the pipes are joined with the main body case.

15. The valve opening/closing drive device according to claim 14, wherein the main body case includes a case body having an opening part and a base plate which closes up the opening part of the case body and is provided with fixing parts fixing respectively the inflow pipe and the outflow pipe, and the holder member is provided with passing-through holes which abut the outer peripheral face of the inflow pipe or the outflow pipe at a prescribed separate position from the fixing part.

16. The valve opening/closing drive device according to claim 15, wherein the fixing part of the base plate is constituted of a step-like part to be inserted by the end part of the inflow pipe or the outflow pipe, and the step-like part performs a temporary holding in cooperation with the temporary holding part of the holder member when the inflow pipe or the outflow pipe is joined with the main body case.

17. The valve opening/closing drive device according to claim 14, wherein the case body having the opening part includes an approximately cup-shaped press working component having a trunk part.

18. The valve opening/closing drive device according to claim 17, wherein the holder member is provided with the temporary holding part, a flat surface part which is placed to overlap the main body case, a stator mounting part for mounting to a stator part, and an attaching face part for attaching to other equipment.

19. The valve opening/closing drive device according to claim 14, wherein the valve element is a needle valve.

20. The valve opening/closing drive device according to claim 14, wherein the valve element is a ball valve.

21. The valve opening/closing drive device according to claim 14, wherein the valve element is a circular plate.

* * * * *